US006891912B1

(12) United States Patent
Lukic et al.

(10) Patent No.: US 6,891,912 B1
(45) Date of Patent: May 10, 2005

(54) FUEL ASSEMBLIES IN A REACTOR CORE AND METHOD OF DESIGNING AND ARRANGING SAME

(75) Inventors: Yovan D. Lukic, Paradise Valley, AZ (US); Jeffrey S. Schmidt, Glendale, AZ (US)

(73) Assignee: Pinnacle West Capital Corporation, Phoenix, AZ (US)

( * ) Notice: Subject to any disclaimer, the term of this patent is extended or adjusted under 35 U.S.C. 154(b) by 0 days.

(21) Appl. No.: 10/400,942

(22) Filed: Mar. 26, 2003

Related U.S. Application Data

(60) Provisional application No. 60/392,302, filed on Jun. 26, 2002.

(51) Int. Cl.[7] ................................................ G21C 19/30
(52) U.S. Cl. ...................... 376/267; 376/241; 376/305; 376/306; 376/419; 376/435
(58) Field of Search ................................ 376/241, 267, 376/305, 306, 419, 435; 703/16, 22

(56) References Cited

U.S. PATENT DOCUMENTS

| | | | | | |
|---|---|---|---|---|---|
| 4,018,697 A | * | 4/1977 | Smith | ........................ | 252/636 |
| 4,273,613 A | * | 6/1981 | Radkowsky | ................ | 376/267 |
| 4,574,069 A | * | 3/1986 | Ross et al. | .................. | 376/267 |
| 4,820,473 A | * | 4/1989 | Ohashi et al. | .............. | 376/305 |

(Continued)

FOREIGN PATENT DOCUMENTS

EP            0307144 A2 * 1/1988

OTHER PUBLICATIONS

Lukic & Schmidt, Taming the Crud Problem, a Utility Perspective Presented at 10th International RETRAN Meeting Oct. 14, 2001.

Zhou & Jones, Boron Concentration Model and Effects on Boron Holdup on Axial Ofset Anomaly (AOA) in PWRs Apr. 14, 2002.

EPRI DESTINATIONS, Robust Fuel Program.

Corrosion Products Deposition Under Subcooled Nucleate Boiling, www.nri.cz/reactor/achievements_chemistry_depos.htm May 10, 2002 (abstract).

Nuclear Research Index 2001 to 2002—Chemical Process—www.hse.gov.uk/nsd/resindex/2/water.htm May 10, 2002 (abstract).

Fuel Safety Criteria Technical Review– Results of OECD/CSNI/PWG2 Task Force on Fuel Safety Criteria p. 18 Jul. 20, 2000.

Experimental Investigation On The Effects Of Coolant Concentration On Subcooled Boiling And Crud Deposition On Reactors Cladding At Phototypical PWR Operating Conditions—Kansas State Univ. May 10, 2002 (abstract).

2000 Summary of Engineering Research—Nuclear, Plasma & Radiological Engineering www.engr.uiuc.edu/Publications/engineering_research/NUCENC.summary.6.html May 10, 2002 (abstract).

Primary Examiner—Michael J. Carone
Assistant Examiner—John Richardson
(74) Attorney, Agent, or Firm—Lowell W. Gresham; Jordan M. Meschkow; Meschkow & Gresham, P.L.C.

(57) ABSTRACT

A reactor core (104) includes fuel assemblies (202) arranged in a loading pattern (1100) in response to corresponding power levels of the fuel assemblies (202). A crud deposition model (412) is used to predict crud deposition on the fuel assemblies (202) and fuel pins (300) within the fuel assemblies (202). The prediction of crud deposition enables generation of the loading pattern (1100) and design of lattice structures (1600) for the fuel assemblies (202) that results in the reduction of total crud deposition in the reactor core (104) and causes a substantially uniform crud deposition on the fuel assemblies (202) of the reactor core (104).

23 Claims, 16 Drawing Sheets

U.S. PATENT DOCUMENTS

| | | | |
|---|---|---|---|
| 4,842,812 A | * 6/1989 | Panson et al. | 376/306 |
| 4,894,202 A | * 1/1990 | Nagase et al. | 376/306 |
| 5,093,070 A | * 3/1992 | Koyama et al. | 376/267 |
| 5,116,567 A | * 5/1992 | Fennern | 376/433 |
| 5,149,491 A | * 9/1992 | Congdon et al. | 376/267 |
| 5,202,084 A | * 4/1993 | Fennern et al. | 376/433 |
| 5,243,633 A | * 9/1993 | Bryan et al. | 376/419 |
| 5,602,888 A | * 2/1997 | Hettiarachchi et al. | 376/305 |
| 5,673,297 A | * 9/1997 | Andresen | 376/306 |
| 5,715,290 A | * 2/1998 | Uetake et al. | 376/306 |
| 5,875,224 A | * 2/1999 | Smith et al. | 376/439 |
| 5,953,387 A | * 9/1999 | Dix et al. | 376/435 |
| 6,263,038 B1 | * 7/2001 | Kantrowitz et al. | 376/435 |
| 6,347,130 B1 | * 2/2002 | Nylund | 376/433 |
| 6,396,892 B1 | * 5/2002 | Frattini et al. | 376/308 |
| 6,606,368 B2 | * 8/2003 | Takamori et al. | 376/305 |

* cited by examiner

WEIGHTING COEFFICIENTS, $w_i$ ~506

600

$$w_i = \frac{\left[1 + \frac{t_{i+1} + t_i - 2 \cdot t_0}{2 \cdot \tau}\right]^f}{\sum_{j=0}^{N-1}\left[1 + \frac{t_{j+1} + t_j - 2 \cdot t_0}{2 \cdot \tau}\right]^f} \qquad o \le i \le N-1$$

WHERE, $t_i$ = BEGINNING OF BURNUP INTERVAL $i+1$; ALSO END OF BURNUP INTERVAL $i$ *(hr)*

$f$ = MODEL PARAMETER CALCULATED DURING REGRESSION ANALYSIS *(unitless)*

---

COOLANT STEAMING RATE, $\psi_i(z)$ ~508

602

$$\psi_i(z) = \frac{q_i''(z) - h_{\Delta T} \cdot \Delta T_i(z) - h_v \cdot v_i(z)}{f_g H_i(z)} \qquad o \le i \le N-1$$

WHERE, $q_i''(z)$ = BURNUP INTERVAL $i+1$ HEAT FLUX AT AXIAL LOCATION $\left(\frac{Btu}{ft^2 \cdot hr}\right)$ $\Delta T_i(z)$ = BURNUP INTERVAL $i+1$ TEMPERATURE DIFFERENCE BETWEEN CLAD SURFACE AND COOLANT AT AXIAL LOCATION $z$ *(°F)*

$v_i(z)$ = BURNUP INTERVAL $i+1$ SUB-CHANNEL COOLANT VELOCITY AT AXIAL LOCATION $z \left(\frac{ft}{sec}\right)$ $f_g H_i(z)$ = BURNUP INTERVAL $i+1$ COOLANT HEAT OF VAPERIZATION AT AXIAL LOCATION $z \left(\frac{Btu}{lbm}\right)$ $h_{\Delta T}$ = MODEL PARAMETER CALCULATED DURING REGRESSION ANALYSIS $\left(\frac{Btu}{ft^2 \cdot hr \cdot °F}\right)$ $h_v$ = MODEL PARAMETER CALCULATED DURING REGRESSION ANALYSIS $\left(\frac{Btu}{ft^2 \cdot hr \cdot \frac{ft}{sec}}\right)$

---

STEAMING RATE CORRECTION FACTOR, $\xi_i(z)$ ~510

604

$$\xi_i(z) = \left[1 - \left(\frac{\partial T_e}{\partial T_f}\right)_i\right]^a \qquad o \le \left(\frac{\partial T_e}{\partial T_f}\right)_i \le 1$$
$$= 0 \qquad \text{OTHERWISE} \qquad o \le i \le N-1$$

WHERE, $\left(\frac{\partial T_e}{\partial T_f}\right)_i$ = BURNUP INTERVAL $i+1$ DERIVATIVE OF THE CLAD-WALL TEMPERATURE WITH RESPECT TO COOLANT TEMPERATURE, AT AXIAL LOCATION *(unitless)*

$e$ = MODEL PARAMETER CALCULATED DURING REGRESSION ANALYSIS *(unitless)*

FIG. 6

OXIDE LAYER DEPOSITION REGRESSION MODEL, $\Omega_j(z)$ $$\Omega_j(z) = a \cdot \sum_{i=0}^{j} \left(\frac{t_i}{\tau}\right)^2 \cdot (\delta T_{i-1}^2 - \delta T_i^2) + b \cdot \sum_{i=0}^{j} \left(\frac{t_i}{\tau}\right)^2 \cdot (\theta_{i-1}^2 - \theta_i^2) \quad 1 \leq j \leq N$$

WHERE, $\delta T_{-1}^2 \equiv 0; \quad \theta_{-1}^2 \equiv 0; \quad \delta T_j^2 \equiv 0; \quad \theta_j^2 \equiv 0$

AND, $\Omega_j(z)$ = END OF BURNUP INTERVAL $j$ OXIDE THICKNESS AT AXIAL LOCATION $z$ ($ft$)

$\delta T_i(z)$ = BURNUP INTERVAL $i+1$ TEMPERATURE DIFFERENCE BETWEEN CLAD SURFACE AND A 570°F REFERENCE TEMPERATURE, AT AXIAL LOCATION $z$ (°F)

$\theta_i(z)$ = END OF BURNUP INTERVAL $i$ CRUD THICKNESS AT AXIAL LOCATION $z$ ($ft$) ; SEE EQ. 1

$t_i$ = BEGINNING OF BURNUP INTERVAL $i+1$ ; ALSO END OF BURNUP INTERVAL $i$ ($hr$)

$\tau$ = FUEL CYCLE LENGTH ($hr$) = 12,490 HRS $a$ = MODEL PARAMETER CALCULATED DURING REGRESSION ANALYSIS $\left(\frac{ft}{°F^2}\right)$ $b$ = MODEL PARAMETER CALCULATED DURING REGRESSION ANALYSIS $\left(\frac{1}{ft}\right)$

FIG. 7

FUEL ASSEMBLIES IN A REACTOR CORE AND METHOD OF DESIGNING AND ARRANGING SAME

RELATED INVENTION

The present invention claims priority under 35 U.S.C. §119(e) to: "Taming the Crud Problem—A Utility Perspective," Provisional U.S. Provisional Patent Application Ser. No. 60/392,302, filed 26 Jun. 2002, which is incorporated by reference herein.

TECHNICAL FIELD OF THE INVENTION

The present invention relates to the field of nuclear reactors. More specifically, the present invention relates to designing and arranging fuel assemblies in a reactor core to control deleterious crud deposition.

BACKGROUND OF THE INVENTION

In a typical nuclear power plant, heat energy is generated by fissioning uranium fuel within a reactor core. The heat energy is then collected in water, also known as coolant, and is carried away from the reactor core either as steam in boiling water reactors or as subcooled water in pressurized-water reactors. In a pressurized-water reactor, the sub-cooled water in the primary cooling loop is used to transfer heat energy to a secondary loop for the creation of steam. In either a boiling-water or pressurized-water installation, steam under high pressure is then used to transfer the nuclear reactor's heat energy to a turbine that mechanically turns an electric generator.

The reactor core for a nuclear power plant typically includes many fuel assemblies. A fuel assembly contains a group of sealed fuel pins, or rods, each filled with uranium oxide pellets. A thin-walled metal tube, known as cladding, forms the outer jacket of each fuel pin. The cladding prevents the release of fission products into the coolant. Stainless steel, and zirconium alloys are common cladding materials. The fuel pins are held in place by end plates and supported by metal spacer-grids to brace the pins and maintain the proper distance between them. In operation, the coolant flows in sub-channels between each of the fuel-pins within each of the fuel assemblies to carry the heat energy, extracted through the nuclear chain reaction process, away from the core.

Marketplace pressure has driven the need for reducing power plant operating costs and increasing capacity factor, i.e., the ratio of the actual electrical energy to the energy that could have been generated at continuous full-power operation during the same period. In an attempt to meet the marketplace demands, nuclear power plants are shifting toward more efficient core designs. One such evolution of reactor core design is the transition from traditional checkerboard loading patterns of fuel assemblies to Ring-of-Fire, or Saturn, loading patterns. The Ring-of-Fire designs typically exhibit longer cycle length, higher average enrichments, and higher fuel duty than checkerboard designs.

The higher fuel duty of the Ring-of-Fire loading patterns advantageously results in increased nucleate, or sub-cooled boiling, enhancing the efficiency of heat transfer. The onset of sub-cooled boiling indicates the location where the vapor can first exist in a stable state on the surface of the fuel pins without condensing or vapor collapse. As more energy is input into the liquid (i.e., downstream axially) these vapor bubbles can grow and eventually detach from the fuel pin surface and enter the coolant.

Although the efficiency of heat transfer is enhanced, unfortunately the higher fuel duty also causes deleterious crud and oxide deposition on cladding surfaces of the fuel pins. The term "crud" is an acronym for Chalk River Unidentified Deposits first discovered as black, highly radio-active material covering fuel assemblies at the Chalk River nuclear reactor. CRUD has now become a standard industry term referring to minute, solid, corrosion products that travel into the reactor core, become highly radioactive, adhere to the fuel pins of the fuel assemblies, and also flow out of the reactor into other systems in the plant. Excessive crud deposition inhibits heat transfer, thus increasing clad temperature and oxide layer growth rate. Excessive crud deposition also concentrates lithium, accelerates corrosion leading to fuel failures, and is a critical contributing factor to the onset of axial offset anomaly (AOA).

AOA is a major impediment to increases in reactor fuel performance. AOA is an unexpected deviation in the reactor core axial power distribution during operation from the predicted distribution. Since AOA bears an immediate threat to a nuclear power plant's competitiveness, it is highly desirable to develop strategies to solve or mitigate the AOA problem. Currently, nuclear power plant operators are avoiding AOA though reload management, which is an inefficient and costly remedy to the problem.

Due to the deleterious effects of excessive crud deposition in a reactor core, and its contribution to the onset of axial offset anomaly (AOA), what is needed is an approach for minimizing the adverse impact of crud deposition in a reactor core.

SUMMARY OF THE INVENTION

Accordingly, it is an advantage of the present invention that a reactor core and a method of designing and arranging fuel assemblies in a reactor core are provided that reduce the adverse impact of crud deposition.

It is another advantage of the present invention that a reactor core and method of arranging fuel assemblies in a reactor core are provided that inhibit Axial Offset Anomaly.

Another advantage of the present invention is that a reactor core and method are provided that maintain the benefit of cost efficient ring type loading patterns without challenging power plant operations and fuel pin integrity.

Yet another advantage of the present invention is a reactor core and method are provided that are cost effectively implemented.

The above and other advantages of the present invention are carried out in one form by a method of arranging fuel assemblies in a reactor core. The method calls for establishing a first loading pattern for the fuel assemblies, and predicting crud deposition on the fuel assemblies in the first loading pattern. The first loading pattern is altered in response to the predicted crud deposition to generate a second loading pattern for the fuel assemblies.

The above and other advantages of the present invention are carried out in another form by a reactor core. The reactor core includes first fuel assemblies characterized by a first power level and second fuel assemblies characterized by a second power level. The first and second fuel assemblies are arranged in response to the first and second power levels to form a loading pattern predicted to cause substantially uniform crud deposition on the first and second fuel assemblies.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a table of some parameters iterated upon through the implementation of the crud deposition model of FIG. 5;

FIG. 7 shows a table of an oxide layer deposition regression model in mathematical detail;

DETAILED DESCRIPTION OF THE PREFERRED EMBODIMENTS

The present invention predicts the magnitude of crud and oxide deposition on fuel pins within fuel assemblies of a reactor core. The ability to predict crud deposition enables designers to redesign fuel assembly lattice structures and/or generate fuel assembly loading patterns and to so as to minimize the adverse impact of crud deposition. The implementation of the present invention results in the reduction of the overall amount of crud in the reactor core to within manageable levels, while more evenly distributing crud deposition across all fuel assemblies and all fuel pins in the reactor core. The invention is timely and cost effectively implemented by limiting design changes to intra-lattice enrichment splits and burnable poison placement, while disallowing changes in pin diameter, pin pitch, and pin burnable poison type which may require regulator approval.

Figure 1:
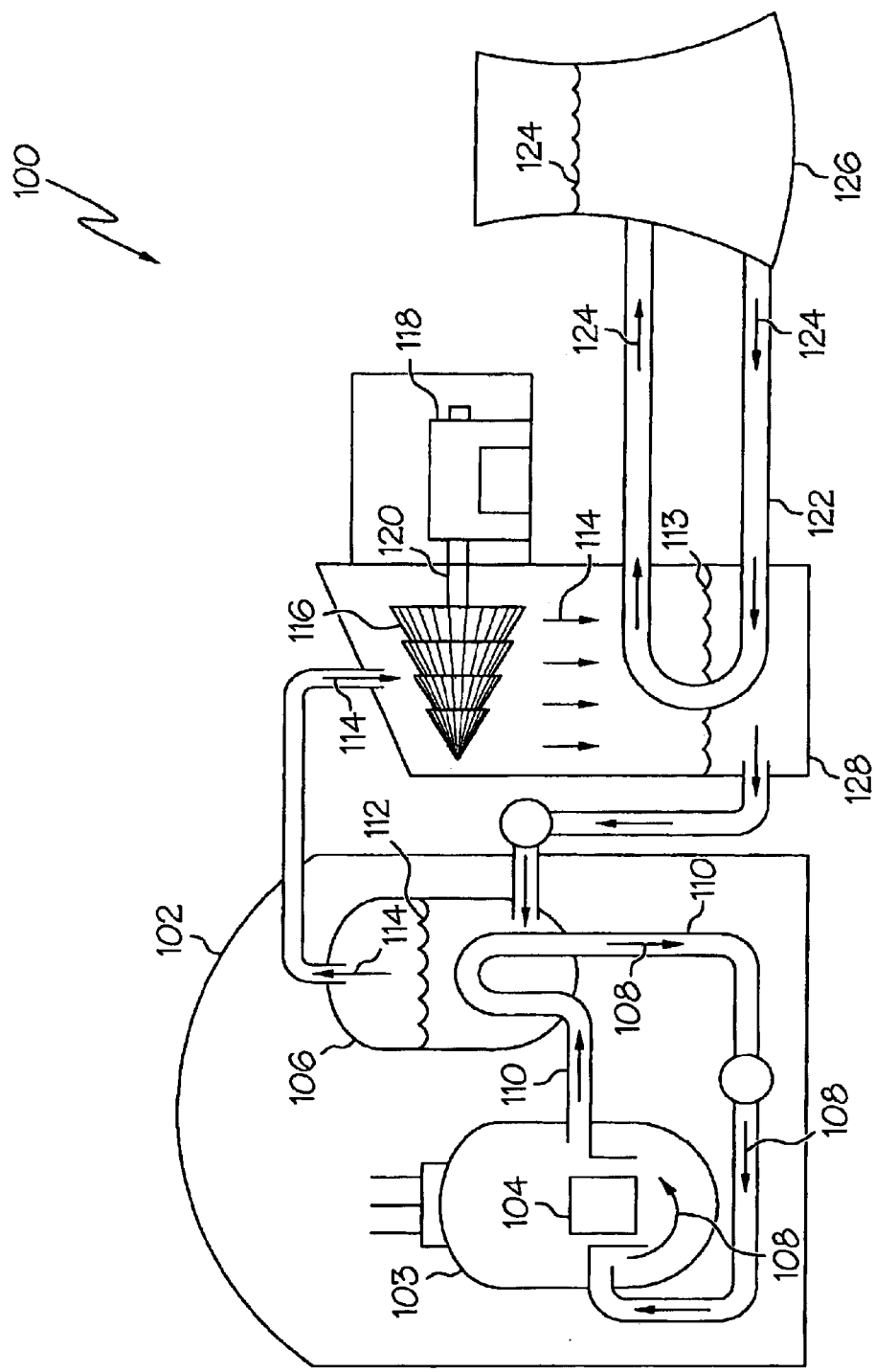
FIG. 1 shows a block diagram of a pressurized water reactor.
Figure 10:
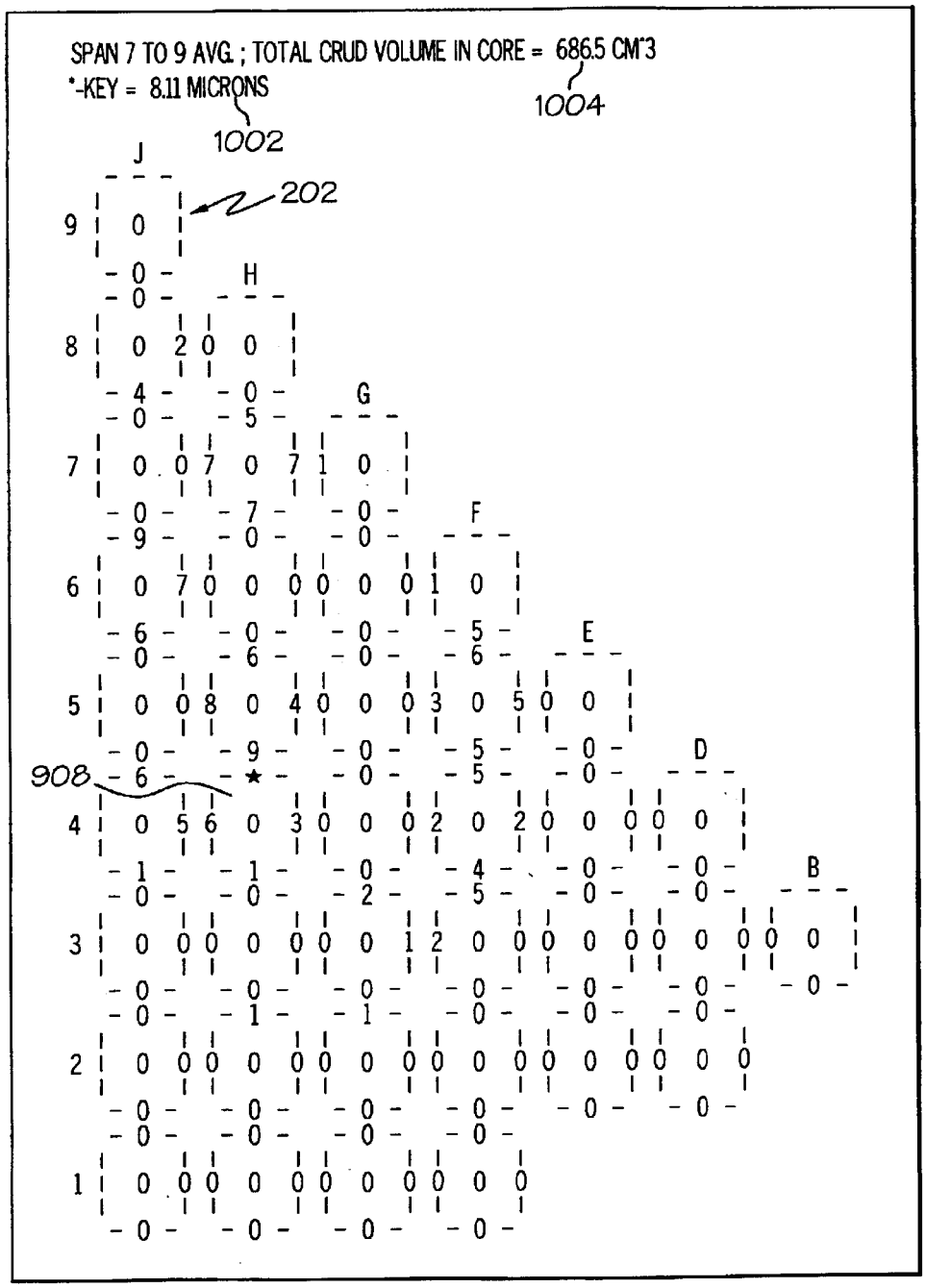
FIG. 10 shows a chart of exemplary sample outputs of predicted crud deposition on fuel assemblies of the initial loading pattern of FIG. 9.

Throughout this discussion, items are assigned three-or four-digit reference numbers whose first digit or first two digits reflects the Figure in which the item first appears. That is, items first appearing in FIG. 1 are assigned reference numbers between 100 and 199, items first appearing in FIG. 10 are assigned reference numbers between 1000 and 1099, etc. Once assigned, a given reference number is used in all Figures in which that item appears.

FIG. 1

FIG. 1 shows a block diagram of a pressurized water reactor 100. In general, pressurized water reactor 100 includes a containment structure 102 in which a reactor vessel 103, housing a reactor core 104, and a steam generator 106 reside. A first source of water, or coolant, represented by an arrow 108, travels in tubes 110 from reactor vessel 103 to steam generator 106 and back to reactor vessel 103. Heat energy from a nuclear chain reaction process occurring in reactor core 104 is collected by coolant 108 and carried away from reactor core 104 as subcooled water. Coolant 108 is kept under high pressure to prevent it from boiling as it travels to steam generator 106.

A secondary source of water 112 passes around the outside of tubes 110 in steam generator 106. The heat from coolant 108 inside tubes 110 is transferred to water 112, which boils and turns to steam, as represented by an arrow 114. Steam 114 is piped into a turbine 116, where the force of steam 114 turns the blades of turbine 116. Turbine 116 is connected to an electric generator 118 by a rotating shaft 120. As the turbine blades begin to spin, a magnet inside generator 118 also turns, and that produces electricity.

Once steam 114 has been used to drive turbine 116, steam 114 is condensed back to water 112 by circulating around condenser tubes 122 (which carry cool water 124 from an adjacent lake or cooling tower 126) in a condenser 128. The condensed steam, now cool water 113, is pumped to steam generator 106 to repeat the cycle. Water 124 in condenser tubes 122 picks up heat from steam 114 passing around the outside of condenser tubes 122. This heated water 124 may be passed through cooling tower 126 before being returned to the lake or reused in pressurized water reactor 100. The three water systems are separated from each other to ensure that radioactive water does not mix with nonradioactive water.

FIG. 2

Figure 2:
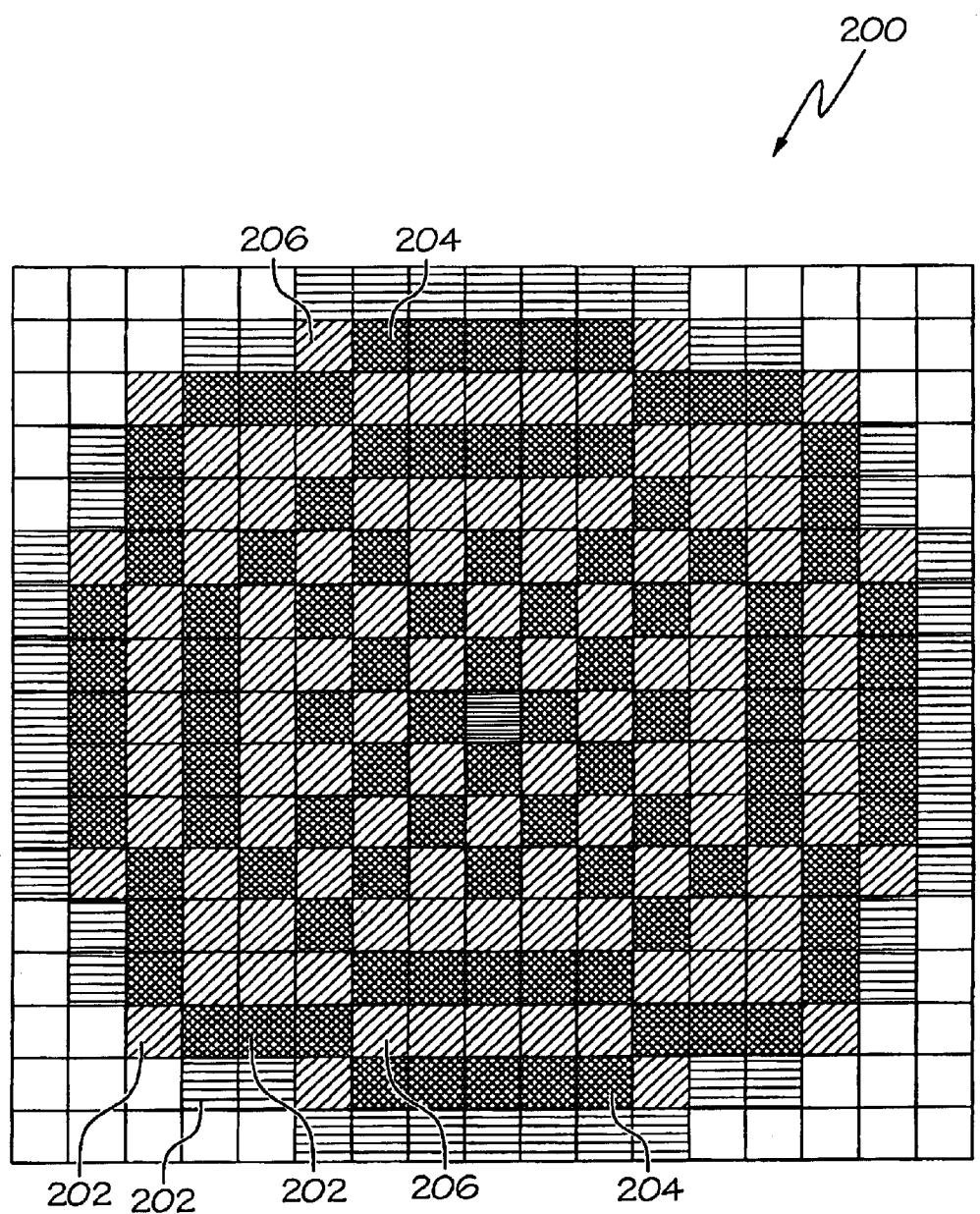
FIG. 2 shows a block diagram of an exemplary ring type loading pattern for fuel assemblies of a reactor core of the pressurized water reactor.

FIG. 2 shows a block diagram of an exemplary, conventional ring type loading pattern 200 for fuel assemblies of a reactor core of pressurized water reactor 100. In the block diagram of FIG. 2, each of blocks 202 represents a distinct one of the fuel assemblies. Thus, for clarity of discussion, blocks 202 will be referred to hereinafter as fuel assemblies 202.

In general, the majority of fuel assemblies 202 of ring type loading pattern 200 are feed (new) fuel assemblies 204 and once-burned fuel assemblies 206. Outer rings of ring type loading pattern 200 may be formed by loading adjacent feed fuel assemblies 204, while a checkerboard pattern of feed fuel assemblies 204 and once-burned fuel assemblies 206 may be formed at the center of reactor core 104. Other fuel assemblies 202 about the periphery and at the center of loading pattern 200 may include twice-burned and thrice-burned fuel assemblies.

FIG. 3

Figure 3:
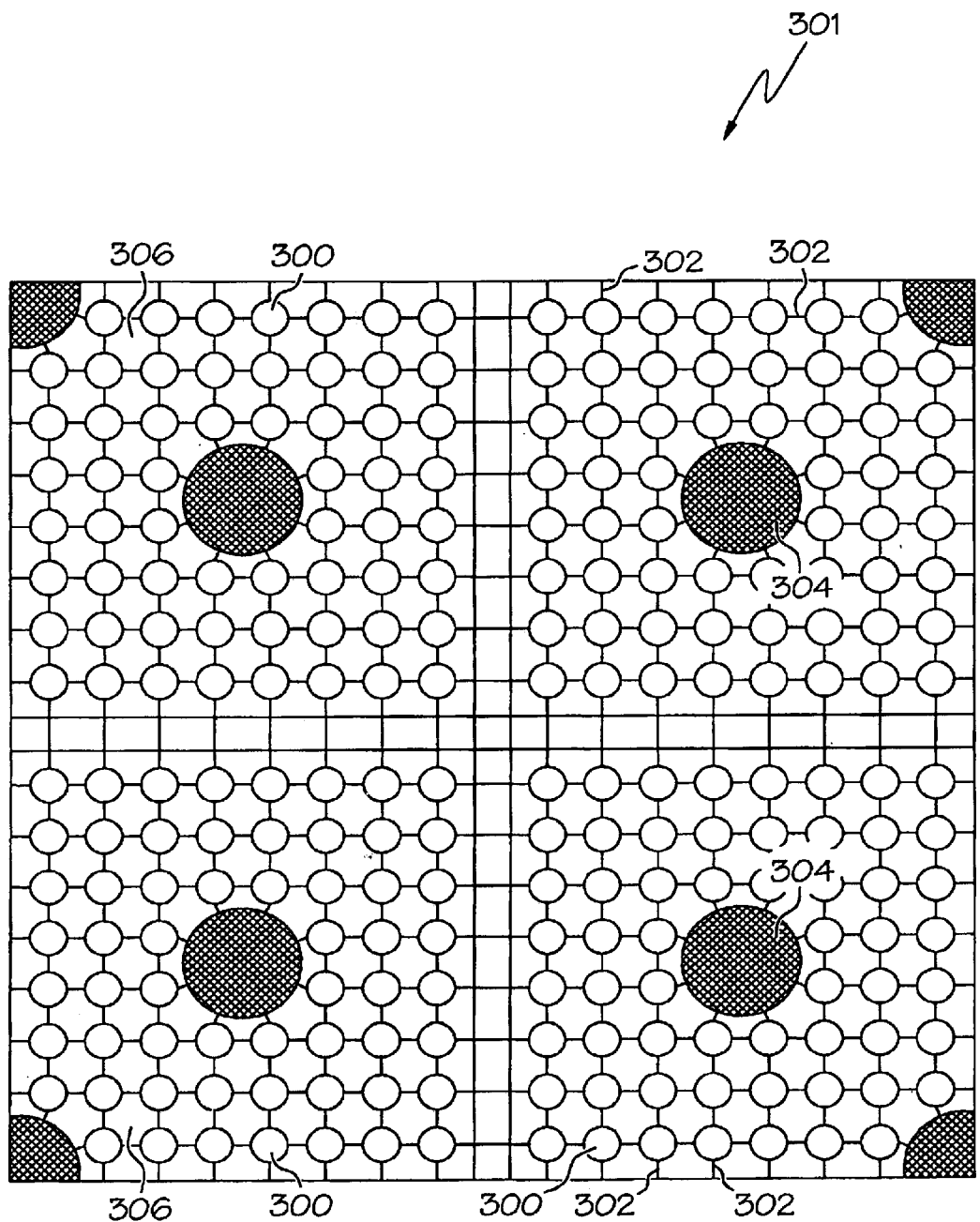
FIG. 3 shows a block diagram of a "4 quarter" model of fuel assemblies of the reactor core.

FIG. 3 shows a block diagram of a thermal/hydraulic (T/H) model 301 of fuel assemblies 202. In the block diagram of FIG. 3, each of circles 300 represents a distinct fuel pin. T/H model 301 is a 353 sub-channel, 4 quarter assemblies T/H model. That is, T/H model 301 is centered on a shared corner of four of fuel assemblies 202. Thus, the term "4 quarter" refers to a quarter of each of four fuel assemblies 202. In an exemplary embodiment, each quarter of each of fuel assemblies 202 is an eight by eight grid of fuel pins 300. As such, the term "353 sub-channel" refers to the 353 sub-channels 306 between fuel pins 300 and between the borders of each of the four fuel assemblies 202.

The T/H model 301 is further shown with metal spacer-grids 302 and guide tubes 304. Metal spacer grids 302 within fuel assemblies 202 brace fuel pins 300 and maintain the proper distances between them. Guide tubes 304 provide channels which guide the control rods (not shown) over their entire length of travel through fuel assembly 202. In operation, coolant 108 flows in sub-channels 306 between each of fuel pins 300 to carry heat energy from reactor core 104.

Each of fuel pins 300 is identified by its "enrichment." Because less than one percent of uranium ore contains uranium-235, the form used for energy production, uranium must be treated to increase the concentration of uranium-235. This treatment process—called uranium enrichment—increases the percentage of uranium-235 from one to five percent. Fuel assembly 202 may include high-enriched fuel pins and low-enriched fuel pins. By definition, high-enriched fuel pins include uranium that has been enriched to a greater degree than low-enriched fuel pins.

Integral burnable absorber pins may also be included in fuel assembly 202, replacing fuel pins 300 at selected locations. The burnable absorber pins are mechanically similar to the fuel rods, but include a burnable poison, such as erbium admixed with enriched uranium. The burnable absorber pins provide advantages in terms of lower core power peaking, increased core operating margin, reduced fuel cycle costs, and contribute to reactivity control. The arrangement of high enrichment pin type and low enrichment pin type fuel pins 300 (i.e., the intra-assembly enrichment split) and the placement of burnable poison pin type fuel pins 300 within fuel assembly 202 is known as a lattice design, or structure.

During an actual fuel outage, a visual inspection was performed of fuel assemblies 202 arranged in ring type loading pattern 200. Visual inspections of fuel pins 300 and eddy current test measurements, known to those skilled in the art, revealed heavy, tenacious crud deposits on the peripheral fuel pins of high-duty adjacent feed fuel assemblies 204. Two contributing factors were observed to cause heavy crud deposition on peripheral fuel pins 300 for ring type loading patterns, such as pattern 200. The two contributing factors are (1) peripheral fuel pin flow rate values for a fuel assembly 202 are approximately ten percent below the average flow rate value for that fuel assembly 202, and (2) peak fuel pin power occurs in these low flow, peripheral fuel pin locations. The combination of the two factors gives rise to the highest levels of sub-cooled boiling, and hence most crud deposition, in high-duty peripheral fuel pins 300.

In response to the observed heavy crud deposition, T/H model 301 was developed. T/H model 301 is a detailed thermal/hydraulic (T/H) model that establishes localized T/H variables. Close attention was given to modeling the geometry of grid straps 302 to capture potential flow characteristics that may be instrumental in explaining the observed preferential deposition of crud on peripheral fuel pins 300. A key finding based on the developed crud correlation is that the T/H characteristics most conducive to tenacious crud deposition are high heat flux, $q''$, low temperature difference between clad surface and coolant, $\Delta T$, and low coolant velocity, v.

The present invention provides a means for generating loading patterns of fuel assemblies 202 for reactor core 104 and designing the lattice structure of fuel assemblies 202. The present invention further provides means for predicting crud deposition on fuel assemblies of a particular loading pattern and predicting crud deposition on individual fuel pins of a particular lattice structure so as to identify loading patterns and lattice structures that may cause a more even deposition of crud across all fuel pins 300 in fuel assembly 202. In particular, a crud deposition model is utilized as an adjunct to the development of loading patterns of fuel assemblies and to lattice structure design by helping to preclude T/H conditions fostering enhanced crud: deposition. The crud deposition model will be described in greater detail below.

FIG. 4

Figure 4:
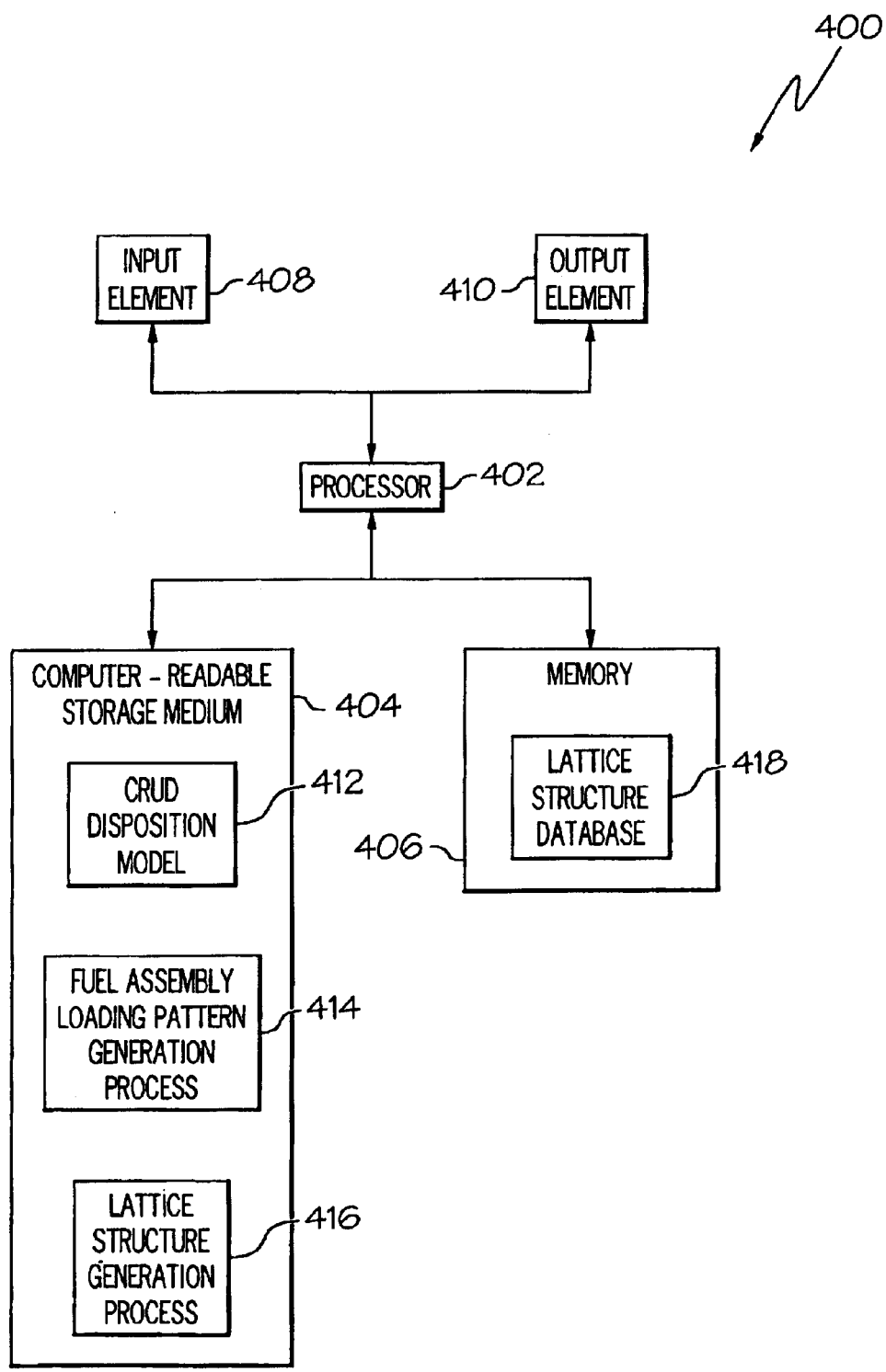
FIG. 4 shows a block diagram of a computing system upon which executable code of the present invention may be executed.

FIG. 4 shows a block diagram of a computing system 400 upon which executable code of the present invention may be executed. Computing system 400 generally includes a processor 402 on which methods according to the invention may be practiced. Processor 402 is in communication with a computer-readable storage medium 404 and a memory 406. Processor 402 is further in communication with an input element 408 and an output element 410. Those skilled in the art will appreciate that additional components and connections may be utilized in a particular computing system in accordance with conventional architectures.

Computer-readable storage medium 404 encompasses executable code in the form of a crud deposition model 412, a fuel assembly loading pattern generation process 314, and a lattice structure generation process 416. That is, crud deposition model 412, fuel assembly loading pattern generation process 414, and lattice structure generation process 416 are protocols or computer programs residing upon computer-readable medium 404 that instruct processor 402 to perform various operations in accordance with preferred embodiments of the present invention.

Crud deposition model 412 was developed from T/H data obtained utilizing CORETRAN/VIPRE2 computer code produced by the Electric Power Research Institute (EPRI) of Charlotte, N.C. Crud deposition model 412 reliably predicts crud deposition (i.e., crud thickness). Crud deposition model 412 will be described in detail in connection with FIGS. 4–6.

Fuel assembly loading pattern generation process 414 is a computer-based method used to facilitate the arrangement of fuel assemblies 202 in reactor core 104. Process 414 employs crud deposition model 412 to generate loading patterns in response to predicted crud depositions on fuel assemblies 202, with the object being to identify a loading pattern in which crud deposition within reactor core 104 will be managed to acceptable levels and be more uniformly deposited over each of fuel assemblies 202. Fuel assembly loading pattern generation process 414 will be described in detail in connection with FIGS. 7–9.

Lattice structure generation process 416 is a computer-based method used in the design of lattice structures defining an arrangement of fuel pins 300 in one of fuel assemblies 202. Process 416 employs knowledge gained through the execution of crud deposition model 412 to identify lattice structures in response to predicted crud depositions on fuel pins 300, with the object being to identify a candidate lattice structure in which crud deposition within fuel assembly 202 will be substantially uniform over each of fuel pins 300. Lattice structure generation process 416 will be described in detail in connection with FIGS. 10–12.

A single computer-readable storage medium 404 encompassing each of crud deposition model 412, fuel assembly loading pattern generation process 414, lattice structure generation process 416 is shown for simplicity of illustration. However, it should emphasized that crud deposition model 412, fuel assembly loading pattern generation process 414, lattice structure generation process 416 need not be simultaneously executed. Rather, results gained through the execution of crud deposition model 412 are utilized by both fuel assembly loading pattern generation process 414 and lattice structure generation process 416.

Those skilled in the art will appreciate that, for the purposes of this discussion, computer-readable storage medium 404 may be implemented in central processing unit (CPU) microcode and/or include cooperating or interconnected computer readable media, which exist exclusively on computing system 400 or are distributed among multiple interconnected computer systems (not shown). Alternatively, computer-readable storage medium 404 may be a hard disk, a magnetic disk, compact disk, or any other volatile or non-volatile mass storage system readable by processor 402. The use of any medium or combination of media particular to the past, the present, or the future as computer-readable storage medium 402 does not depart from the spirit of the present invention.

Memory 406 contains a lattice structure database 418. Lattice structure database 418 is developed through the execution of lattice structure generation process 416. In particular, through the methodology of lattice structure generation process 416, computing system 400 identifies a group of lattice structures, sometimes referred to as: a palette of lattice structures, each having a different burnable poison loading, i.e., number of fuel pins 300 containing burnable poison, and differing numbers of high and low fuel pin enrichments.

FIG. 5

Figure 5:
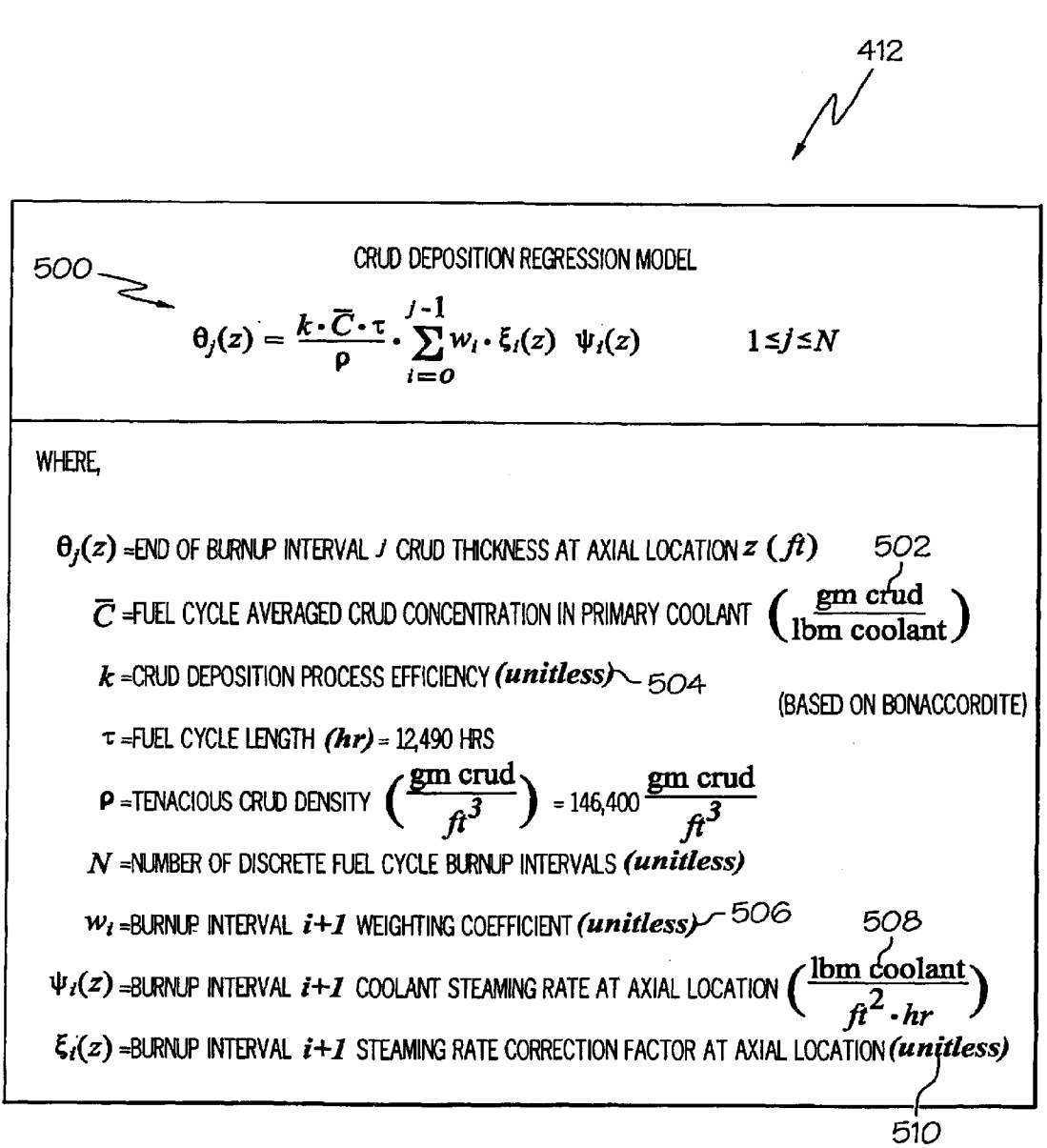
FIG. 5 shows a table containing a crud deposition model in mathematical detail in accordance with the present invention.

FIG. 5 shows a table containing crud deposition model 412 in mathematical detail. Crud deposition model 412 is represented by a crud thickness determination equation 500. Crud thickness determination equation 500 describes crud thickness, $\theta_j(z)$, at the end of a burnup interval j), in terms of input variables. The terms within the summation operator account for changes in magnitude of input variables as a function of burnup time. Parameters in the form of fuel cycle averaged crud concentration in primary coolant, $\overline{C}$, 502; crud deposition process efficiency, k, 504; burnup interval i+1 weighting coefficients, $w_i$, 506; burnup interval i+1 coolant steaming rate at axial location z, $\Psi_i(z)$, 508; and burnup interval i+1 steaming rate correction factor at axial location z, $\xi_i(z)$, 510 are computed as part of the regression analysis.

FIG. 6

FIG. 6 shows a table of some parameters iterated upon through the implementation of the crud deposition model of FIG. 5. In particular, burnup interval i+1 weighting coefficients, $w_i$, 506, burnup interval i+1 coolant steaming rate at axial location z, $\Psi_i(z)$, 508, and burnup interval i+1 steaming rate correction factor at axial location z, $\xi_i(z)$, 510 are shown in additional mathematical detail.

Weighting coefficients 506 are computed using a weighting coefficient determination equation 600. Weighting coefficients 506 (i.e., the propensity for crud deposition) are directly related to the relative coolant crud concentration as a function of burnup time. Weighting coefficients 506 are normalized such that the sum of all weighting coefficients 506 adds up to one.

Coolant steaming rate 508 is computed using a coolant steaming rate determination equation 602. Coolant steaming rate 508 is a parameter which provides the rate of coolant vaporization. Conventionally, the steaming rate is calculated by subtracting the convective heat flux from the total heat flux. However, it was determined that an empirically determined steaming rate provides significantly better results than traditional steaming rate calculations.

Steaming rate correction factor 510 is computed using a steaming rate correction factor determination equation 604. Steaming rate correction factor 510 is the variable used to adjust a predicted axial steaming rate. The correction factor improves upon a predicted axial shape of crud deposition so as to more accurately correspond to a shape measured during eddy current test measurements.

Regression analysis provides the means of fitting a data set to the mathematical model that may subsequently be used to make predictions about the output variable in terms of input variables. Crud deposition model 412 has five parameters (k $\underline{C}$, f, $h_{AT}$, $h_v$, and e) that are mathematically adjusted through a regression analysis process by minimizing a chosen "merit function", for example, a sum of the squares of the difference between the model-predicted and the measured value of the output variable. The process of minimizing the merit function is iterative and continues until the merit function effectively stops decreasing. Two methods are available for performing regression analysis, linear and nonlinear, the choice of which type of analysis is applied as dictated by the selected regression model. In a preferred embodiment, nonlinear regression analysis is used herein to quantify crud deposition model 412.

In an exemplary embodiment, a complete regression analysis data set for crud deposition model 412 includes 650 data points, each point corresponding to conditions at a discrete axial location of one of fuel pins 300 of fuel assembly 202. Each data point includes twenty input variables (five variables per burnup interval, i, times four burnup intervals) and one output variable (i.e., $\theta_N$, the end-of-cycle crud thickness). Using initial results of the regression analysis data set, a burnup depend coolant crud concentration, $kC_i$, was inferred by multiplying k $\overline{C}$ with the number of discrete fuel cycle burnup intervals, N, and weighting coefficients 506 as follows:

$$kC_i = k\overline{C} \cdot N \cdot W_I, \quad 0 \leq i \leq N-1$$

A plot of kC as a function of the burnup cycle, i.e., the number of full power days in a reactor's operating cycle (between refueling outage times), revealed that crud deposition decreases monotonically as a function of burnup time (efpd). This insight is valuable in formulating re-design strategy of lattice structures, as discussed below.

Predicted crud thickness, i.e., deposition obtained from crud deposition model 412 was found to match well with qualitative observations made during fuel inspections, thus confirming a consistent predictive ability of crud deposition model 412. As noted by visual inspection and eddy current test measurements, crud deposition model 412 also predicts the thickest crud deposition to occur on the peripheral rows of fuel assembly 202, followed by crud deposition on second rows. Minimal crud deposition is predicted for fuel pins 300 with erbium burnable absorber surrounding guide tubes 304.

This is consistent with the derived coolant crud concentration curve, i.e., the plot of kC discussed above, in that fuel pins 300 with erbium absorber only begin to provide significant levels of power later in the burnup cycle when coolant crud concentration is substantially reduced.

FIG. 7

FIG. 7 shows a table of an oxide layer deposition regression model 700 in mathematical detail. Oxide layer deposition regression model 700 is represented by an oxide layer thickness determination equation 702. Given that excessive tenacious crud deposition enhances the formation of an oxide layer on fuel pins 300, the predicted crud deposition generated through the implementation of crud deposition model 412 is advantageously used as an input variable in addition to T/H parameters.

Oxide layer thickness determination equation 702 describes the oxide layer thickness, $\Omega_j(z)$, (at the end of burnup interval j) in terms of input variables that include $\delta T$, the burnup interval i+1 temperature difference between clad surface and a 570° F. reference temperature, at axial location z, and $\theta$, crud deposition. The terms within the summation operators account for the changes in the magnitude of input variables as a function of burnup time.

Oxide layer deposition regression model 700 has two parameters (a and b) that are mathematically adjusted through a regression analysis process analogous to the one described in connection with crud deposition model 412. Oxide layer thickness obtained from oxide layer deposition regression model 700 was found to match reasonably well with measured values, thus confirming a consistent predictive ability of oxide layer deposition regression model 700.

FIG. 8

Figure 8:
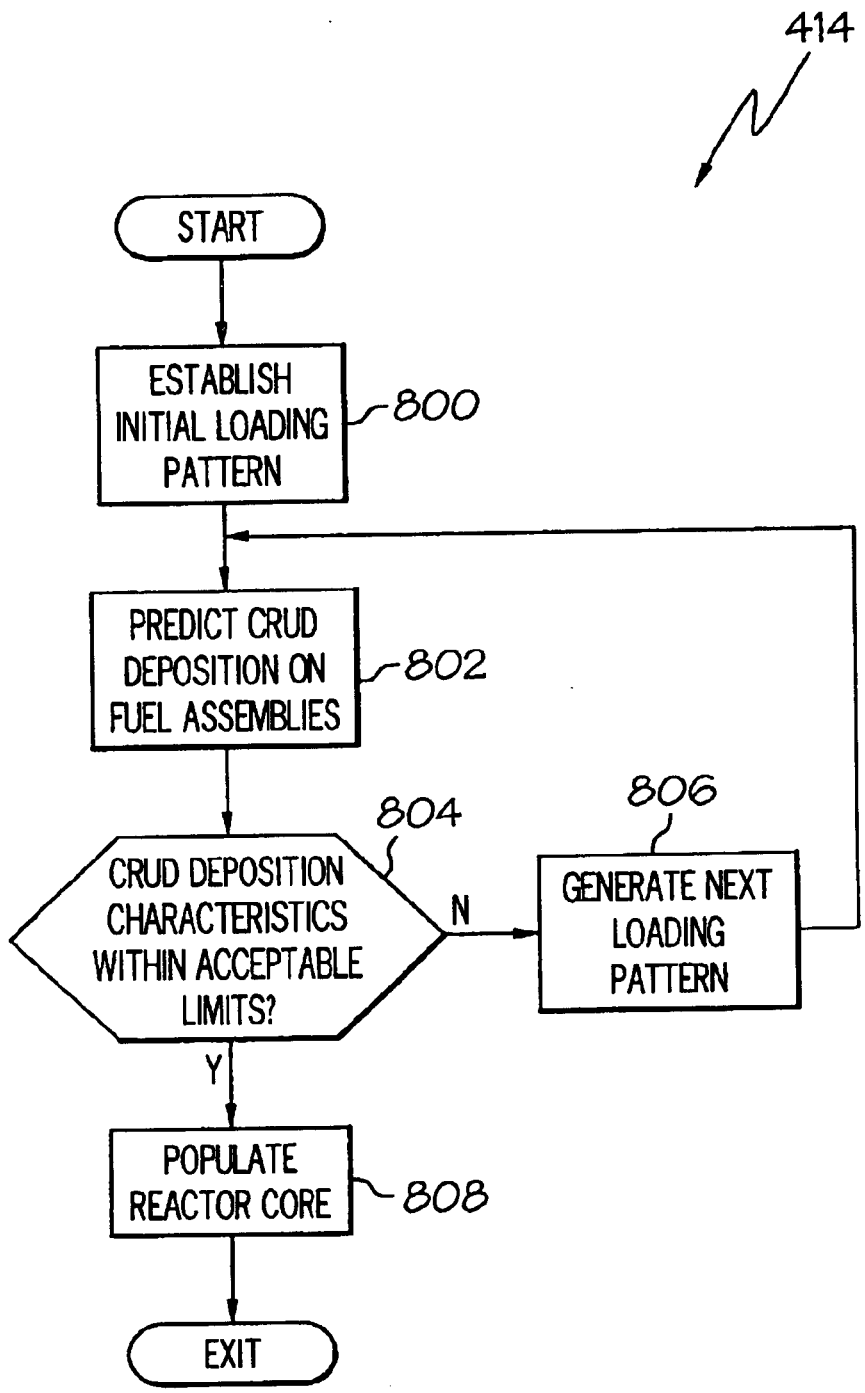
FIG. 8 shows a flowchart of a fuel assembly loading pattern generation process in accordance with a preferred embodiment of the present invention.

FIG. 8 shows a flowchart of fuel assembly loading pattern generation process 414 in accordance with a preferred embodiment of the present invention. An objective of the present invention is to provide a tool that can assist an operator in refining the design of reactor core 104. Fuel assembly loading pattern generation process 414 may be executed at computing system 400 through user commands provided at input element 408.

Fuel assembly loading pattern generation process 414 begins with a task 800. At task 800, an initial loading pattern of fuel assemblies 202 is established. Task 800 may, be fully automated. As such, through the execution of computer code, processor 402 may generate an initial loading pattern in response to input parameters provided by the human operator, such as types of fuel assemblies 202, i.e., a palette of lattice structures, availability of first-, second-, and third-burned fuel assemblies 202, desired power output, and so forth. Alternatively, an operator may enter, via input element 408, the initial loading pattern, in which case processor 402 stores the initial loading pattern in a database and/or presents the initial loading pattern in a graphical form at output element 410.

As discussed previously, a key finding based on the developed correlation is that the T/H characteristics most conducive to tenacious crud deposition are high heat flux, q", low temperature difference between clad surface and coolant, $\Delta T$, and low coolant velocity, v. Accordingly, at task 800, the initial loading pattern may be further established by arranging fuel assemblies 202 such that lower power ones of fuel assemblies 202 are positioned at locations within the initial loading pattern corresponding to positions in reactor core 104 that might exhibit high heat flux, q", low temperature difference between clad surface and coolant, $\Delta T$, or low coolant velocity, v. The remaining tasks in the flowchart of FIG. 8 shall be discussed herein below, following a discussion of FIG. 9.

FIG. 9

Figure 9:
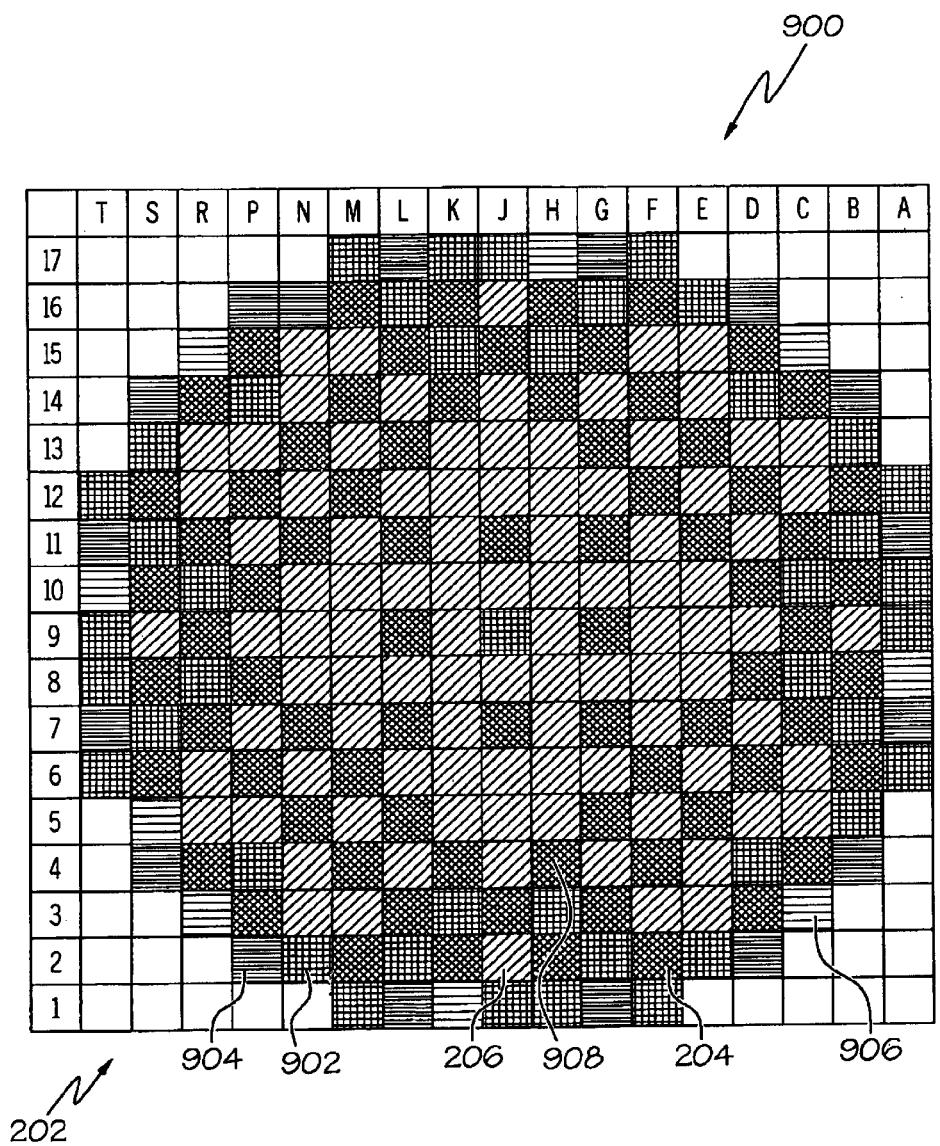
FIG. 9 shows a block diagram of an exemplary initial loading pattern for the reactor core.

FIG. 9 shows a block diagram of an exemplary initial loading pattern 900. Fuel assemblies 202 within initial loading pattern 900 may include feed (new) fuel assemblies 204 and first-burn fuel assemblies 206 generally arranged in a checkerboard pattern. Fuel assemblies 202 within initial loading pattern 900 may also include second feed (new) fuel assemblies 902 whose fuel pins 300 are arranged in a lattice structure that differs from feed fuel assemblies 204. By way of example, feed (new) fuel assemblies 204 may be feed fuel type 1 assemblies and second feed (new) fuel assemblies 902 may be feed fuel type 2 assemblies. In keeping with conventional nomenclature, feed (new) fuel assemblies 204 are referred to as feed fuel type 1 assemblies 204 and second feed (new) fuel assemblies 902 are referred to as feed fuel type 2 assemblies 902 hereinafter. Of course, those skilled in the art will recognize that the designators for the feed fuel assemblies may be other types or may be referred to using other categorization schemes.

In addition, fuel assemblies 202 within initial loading pattern 900 may include second-burn fuel assemblies 904 and third-burn fuel assemblies 906. In an exemplary scenario, one of feed fuel type 2 assemblies 902 exhibits a power level that is lower than a power level for one of feed fuel type 1 assemblies 204. In addition, in the exemplary scenario, first-burn, second-burn, and third-burn fuel assemblies 206, 904, and 906 exhibit power levels that are lower than power levels for feed fuel type 1 assembly 204 and second feed fuel assembly 906.

Letters A–H, J–N, P, R–T are employed herein to distinguish the columns of initial loading pattern 900. Similarly, numbers 1–17 are employed herein to distinguish the rows of initial loading pattern 900. As such, locations can be distinctly identified in initial loading pattern 900 by a letter and number combination. For example, "H4", (i.e., column H, row 4) identifies a first exemplary location 908. Those skilled in the art will recognize that other identification schemes for identifying particular locations or particular ones of fuel assemblies 202 may be employed. Furthermore, it should be understood that the types of fuel assemblies and the arrangement of fuel assemblies 202 provided in initial loading pattern 900 are provided for illustrative purposes only and should not be construed as an actual loading pattern for reactor core 104.

FIG. 8 Continued

Following establishment of initial loading pattern 900, process 414 proceeds to a task 802. At task 802, processor 402 operates to predict crud deposition on feed fuel type 1 assemblies 204, first-burn fuel assemblies 206, feed fuel type 2 assemblies 902, second-burn fuel assemblies 904, and third-burn fuel assemblies 906 in response to depletion during burnup cycle. In an exemplary embodiment, task 802 causes the execution of computer code, known to those skilled in the art, that simulates the depletion of the fuel assemblies 202 in initial loading pattern 900 to the end of a burnup cycle.

Task 802 then causes processor 402 to execute computer code that takes the simulated depletion data, such as that produced as VIPRE2 output data, and calculates from it crud deposition and oxide thickness deposited on individual fuel assemblies within one eighth of initial loading pattern 900, and also on the entire loading pattern 900. The output data may include, for example, the T/H parameters, such as, heat flux, q", temperature difference between clad surface and coolant, ΔT, and coolant velocity, v. This output data can then be applied to crud deposition model 412 to obtain a coarse resolution representation of predicted crud deposition on fuel assemblies 202 in initial loading pattern 900. Such an approach allows the operator to identify particular fuel assemblies 202 that may be subjected to the highest levels of crud deposition.

A query task 804 is performed in response to task 802. Query task 804 determines whether crud deposition characteristics for fuel assemblies 202 of initial loading pattern 900 are within acceptable limits. The crud deposition characteristics may include a peak crud deposition characteristic, crud deposition uniformity, and/or a total core crud deposition characteristic. The remaining tasks in the flowchart of FIG. 8 shall be discussed herein below, following a discussion of FIG. 10.

FIG. 10

FIG. 10 shows a chart of exemplary sample outputs 1000 of predicted crud deposition on fuel assemblies 202 of initial loading pattern 900 for reactor core 104. In particular, FIG. 10 shows sample outputs 1000 for one eighth of initial loading pattern 900 computed in connection with task 802 of fuel assembly loading pattern generation process 414. Each of sample outputs 1000 indicate a peak "lumped" crud deposition characteristic for a grouping of fuel pins 300. In other words, the T/H parameters for a grouping of fuel pins 300 of fuel assemblies 202 are averaged or "lumped" together to find the worst, i.e., the peak, lumped crud deposition characteristic channel. A star, "*", at a top face of fuel assembly 202 at first location 908, designated H4, represents one of sample outputs 1000 having a maximum crud deposition characteristic.

In this exemplary scenario, a peak lumped crud deposition value 1002 at top face of fuel assembly 202 at first location 908 is 8.11 microns. Remaining sample outputs 1000 indicate that crud deposition ranges from a magnitude of 0 to 9 relative to peak lumped crud deposition value 1002. In addition, a total core crud deposition value 1004 may optionally be computed in connection with task 802 of fuel assembly loading pattern generation process 414. In this situation, total core crud deposition value 1004 is 686.5 cm³.

FIG. 8 Continued

Query task 804 compares peak lumped deposition value 1002 to a predetermined peak crud deposition threshold. The predetermined peak crud deposition threshold represents a peak lumped deposition value below a point at which deleterious Axial Offset Anomaly might occur. As such, peak lumped deposition values greater than the threshold are outside of acceptable limits. The predetermined peak crud deposition threshold may be ascertained from observation, experience, measurements, and so forth. Typically, if peak lumped deposition value 1002 is less than the threshold, than the crud deposition will also be substantially uniformly distributed. Although, total core crud deposition value 1004 may also be provided, if peak lumped deposition value 1002 falls below the threshold, than the total core crud deposition will also be acceptable.

In an exemplary situation, a predetermined crud deposition threshold is set at 6.69 microns. As such, peak lumped crud deposition value 1002 of 8.11 microns exceeds the threshold, and is outside of acceptable limits. Consequently, crud deposition is also likely to be non-uniform. A negative response to query task 804 results in program control to proceed to a task 806.

Crud deposition characteristics are evaluated in terms of a peak lumped crud deposition values for simplicity of computation. However, it should be understood that other crud deposition characteristics may alternatively be evaluated. For example, total core crud deposition values may be compared against a corresponding threshold, peak pin crud deposition values may be compared against a corresponding threshold, and so forth.

At task 806, a next loading pattern is generated. The next loading pattern may be generated by altering initial loading pattern 900 in response to the predicted crud deposition represented by sample outputs 1000. For example, one of feed fuel type 1 assemblies 204 is at first location 908. At task 806, feed fuel type 1 assembly 204 may be replaced by a lower power feed assembly, for example, one of feed fuel type 2 assemblies 902. Alternatively, feed fuel type 1 assembly 204 may be replaced with one of the lower power first-burn, second-burn, and third-burn fuel assemblies 206, 904, and 906, respectively.

Following task 806, program control loops back to tasks 802 and 804 to predict crud deposition on the fuel assemblies 202 of the second loading pattern and to determine whether the crud deposition characteristics are within acceptable limits.

At query task 806, when predicted crud deposition characteristics for fuel assemblies 202 of the "next" loading pattern, i.e., initial loading pattern 900, the second loading pattern, or any subsequent loading pattern are within acceptable limits, process 414 proceeds to a task 808.

At task 808, reactor core 104 is populated in accordance with the loading pattern predicted to have acceptable crud deposition characteristics. Following task 808, process 414 exits.

FIG. 11

Figure 11:
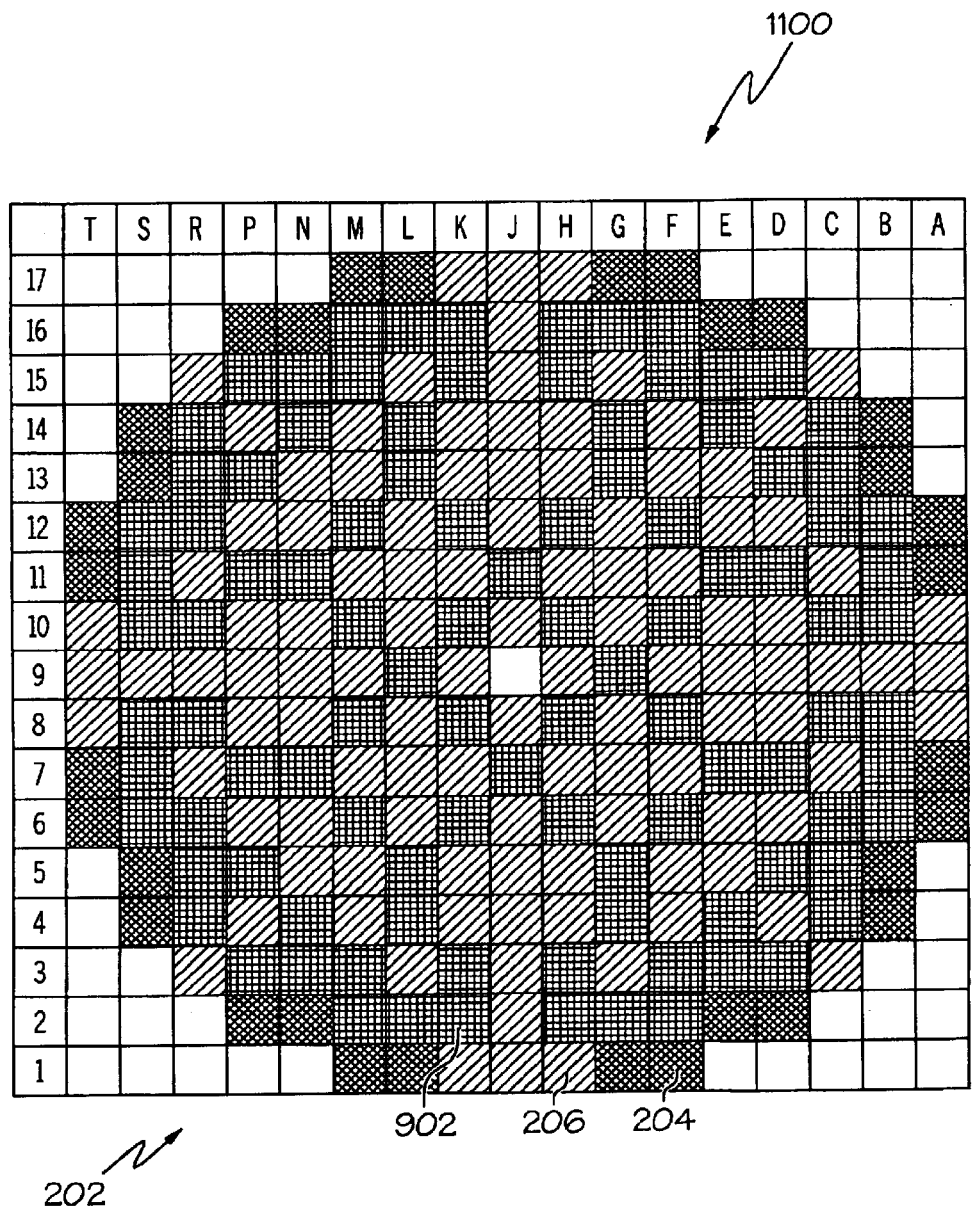
FIG. 11 shows a block diagram of an exemplary second loading pattern for the reactor core.

FIG. 11 shows a block diagram of an exemplary second loading pattern 1100. Like initial loading pattern 900, fuel assemblies 202 within a second loading pattern may include feed fuel type 1 assemblies 204, feed fuel type 2 assemblies 902, first-burn 206, second-burn fuel assemblies 904, and/or third-burn fuel assemblies 906. In this exemplary scenario, second loading pattern 1100 includes feed fuel type 1 assemblies 204, feed fuel type 2 assemblies 902, and first burn fuel assemblies 206. However, the arrangement of the various fuel assemblies 202, while still in a generally checkerboard pattern, differs from initial loading pattern 900. As shown, a greater number of the higher power feed fuel type 1 assemblies 204 and feed fuel type 2 assemblies 902 are located near the periphery of second loading pattern 1100, while a greater number of the lower power first-burn fuel assemblies 206 are located in the interior, i.e., near the core center, of second loading pattern 1100. Again, it should be understood that the types of fuel assemblies 202 and the arrangement of fuel assemblies 202 provided in second loading pattern 1100 are provided for illustrative purposes and should not be construed as an actual loading pattern for reactor core 104.

FIG. 12

Figure 12:
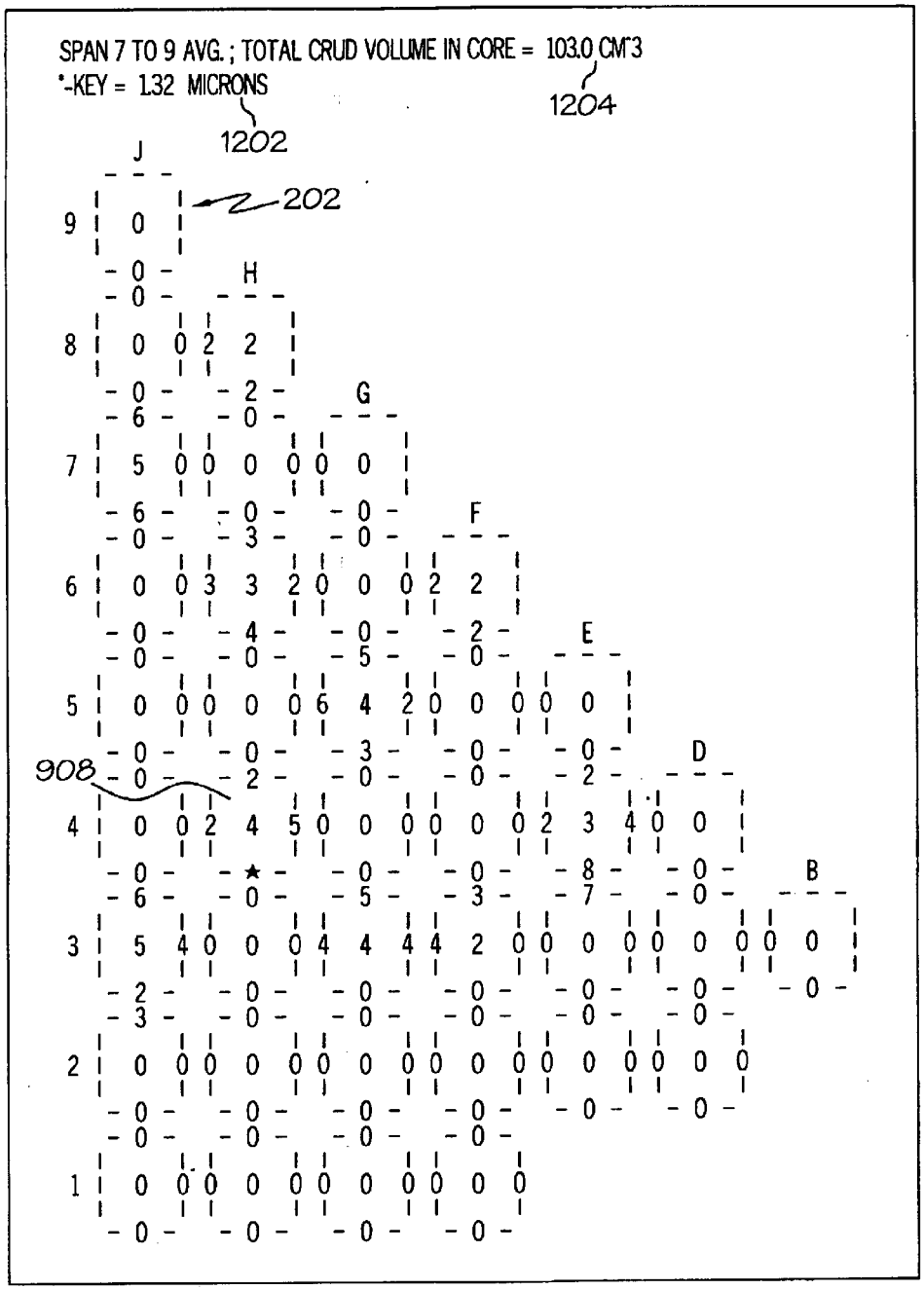
FIG. 12 shows a chart of exemplary sample outputs of predicted crud deposition on fuel assemblies of the second loading pattern of FIG. 11.

FIG. 12 shows a chart of exemplary sample outputs 1200 of predicted crud deposition on fuel assemblies 202 of second loading pattern 1100 for reactor core 104. Like FIG. 10, FIG. 12 shows sample outputs 1200 for one eighth of second loading pattern 1100 computed in connection with task 802 of fuel assembly loading pattern generation process 414.

The star, "*", at a bottom face of fuel assembly 202 at first location 908, designated H4, represents one of sample outputs 1200 having a maximum peak lumped crud deposition value 1202. In this exemplary scenario, peak lumped crud deposition value 1202 at bottom face of fuel assembly 202 at first location 908 is 1.32 microns. Remaining sample outputs 1200 indicate that crud deposition ranges from a magnitude of 0 to 9 relative to peak lumped crud deposition value 1202. For consistency with FIG. 10, a total core crud deposition value 1204 is computed in connection with task 802 of fuel assembly loading pattern generation process 414. In this situation, total core crud deposition value 1204 is 103.0 $\mu m^3$.

In keeping with exemplary situation in which the predetermined crud deposition threshold is set at 6.69 microns, peak lumped crud deposition value 1202 of 1.32 microns falls far below the threshold, and is within acceptable limits. Consequently, crud deposition is also likely to be substantially uniform.

FIG. 13

Figure 13:
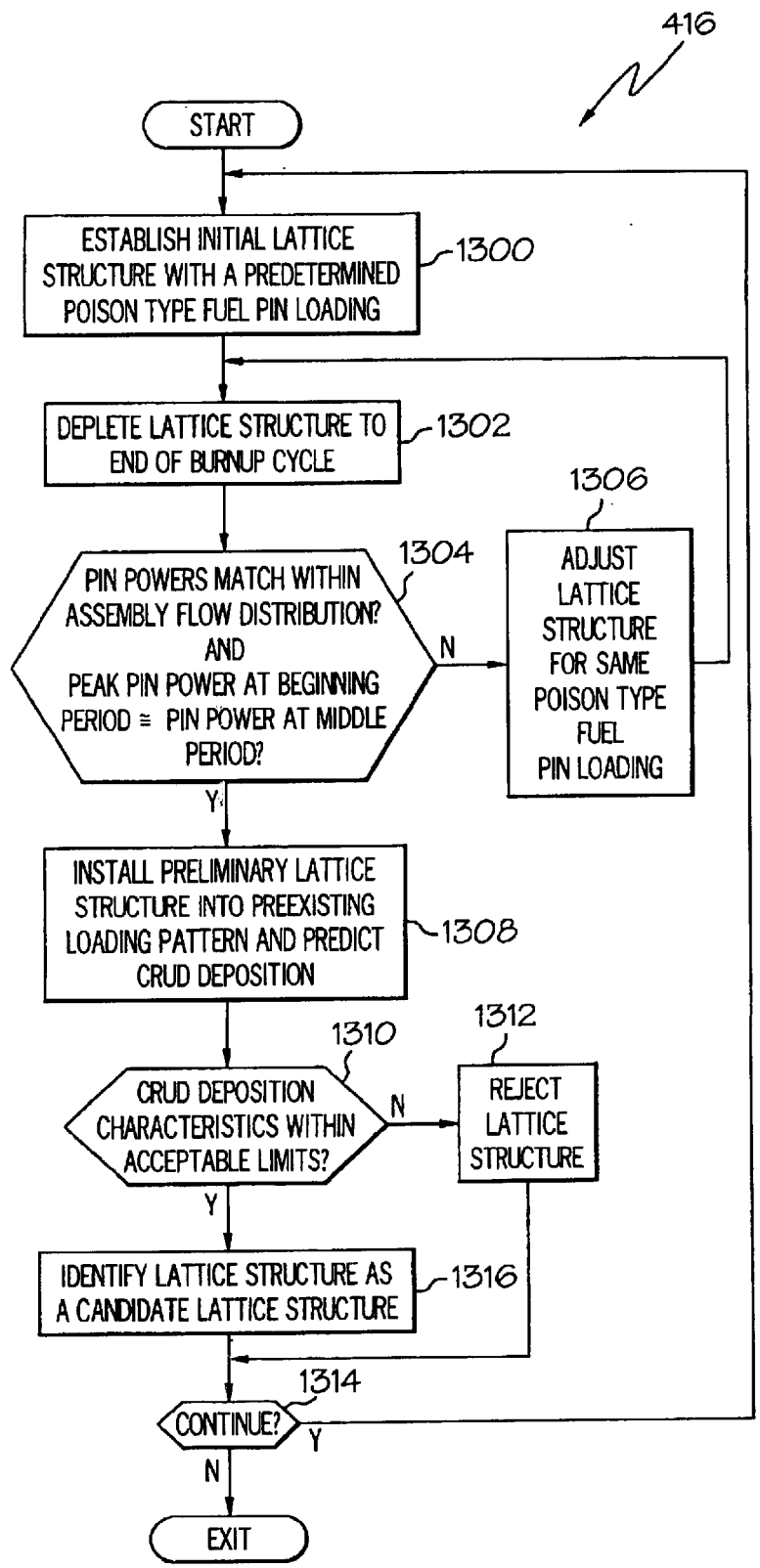
FIG. 13 shows a flowchart of a lattice structure generation process in accordance with another preferred embodiment of the present invention.

FIG. 13 shows a flowchart of lattice structure generation process 416 in accordance with another preferred embodiment of the present invention. A further objective of the present invention is to provide a tool which can assist an operator in redesigning the lattice structure (i.e., the arrangement of the various types of fuel pins 300) of fuel assemblies 202. Lattice structure design aims to reduce total crud deposition on fuel assemblies 202 of reactor core 104. Also, given that crud will inevitably deposit during sub-cooled boiling, the objective of lattice structure design is to more evenly deposit the crud across all fuel pins 200 in the lattice structure. Lattice structure generation process 416 may be executed at computing system 400 through user commands provided at input element 408 to create a palette of predetermined lattice structures for fuel assemblies 202 that have a propensity for substantially uniform crud deposition across fuel pins 300 of each of fuel pins 202.

Lattice structure generation process 416 begins with a task 1300. At task 1300, an initial lattice structure of fuel pins 300 is established. Task 1300 may be fully automated. As such, through the execution of computer code, processor 402 may select an initial lattice structure in response to input parameters provided by the human operator, such as types of fuel pins 300, i.e., a high enrichment pin types, low enrichment pin types, and/or medium enrichment pin types having a percentage of uranium-235 that falls between the percentage of uranium in the high enrichment and low enrichment pin types. Alternatively, processor 402 may select a most frequently employed lattice structure as a starting point for the establishment of the initial lattice structure. In another embodiment, an operator may enter, via input element 408, the initial lattice structure, in which case processor 402 stores the initial lattice structure in a database and/or presents the initial lattice structure in a graphical form at output element 410.

As discussed previously, a key finding based on the developed correlation is that T/H characteristics most conducive to tenacious crud deposition are high heat flux, q", low temperature difference between clad surface and coolant, $\Delta T$, and low coolant velocity, v. Accordingly, at task 1300, an initial lattice structure may be further established by adjusting fuel pins 300 such that low enrichment type fuel pins are positioned at locations within the initial lattice structure corresponding to positions in one of fuel assemblies 202 that might exhibit high heat flux, q", low temperature difference between clad surface and coolant, $\Delta T$, or low coolant velocity, v. For example, in a preferred embodiment, an initial lattice structure is established by adjusting fuel pins 300 so that low enrichment type fuel pins are positioned at locations within the initial lattice structure corresponding to positions in one of fuel assemblies 202 of low coolant velocity, v.

In addition to high enrichment, low enrichment, and/or medium enrichment fuel pins 300, the initial lattice structure may also include a predetermined poison type fuel pin loading. In an exemplary embodiment, the poison type fuel pins include erbium admixed with low-enriched uranium, although it should be understood that other burnable poisons may be utilized in place of erbium. In addition, other enrichment types (i.e., medium or high) may be utilized in place of low-enriched uranium. The "loading" refers to the quantity of poison type fuel pins within the initial lattice structure. The remaining tasks in the flowchart of FIG. 13 shall be discussed herein below, following a discussion of FIG. 14.

FIG. 14

Figure 14:
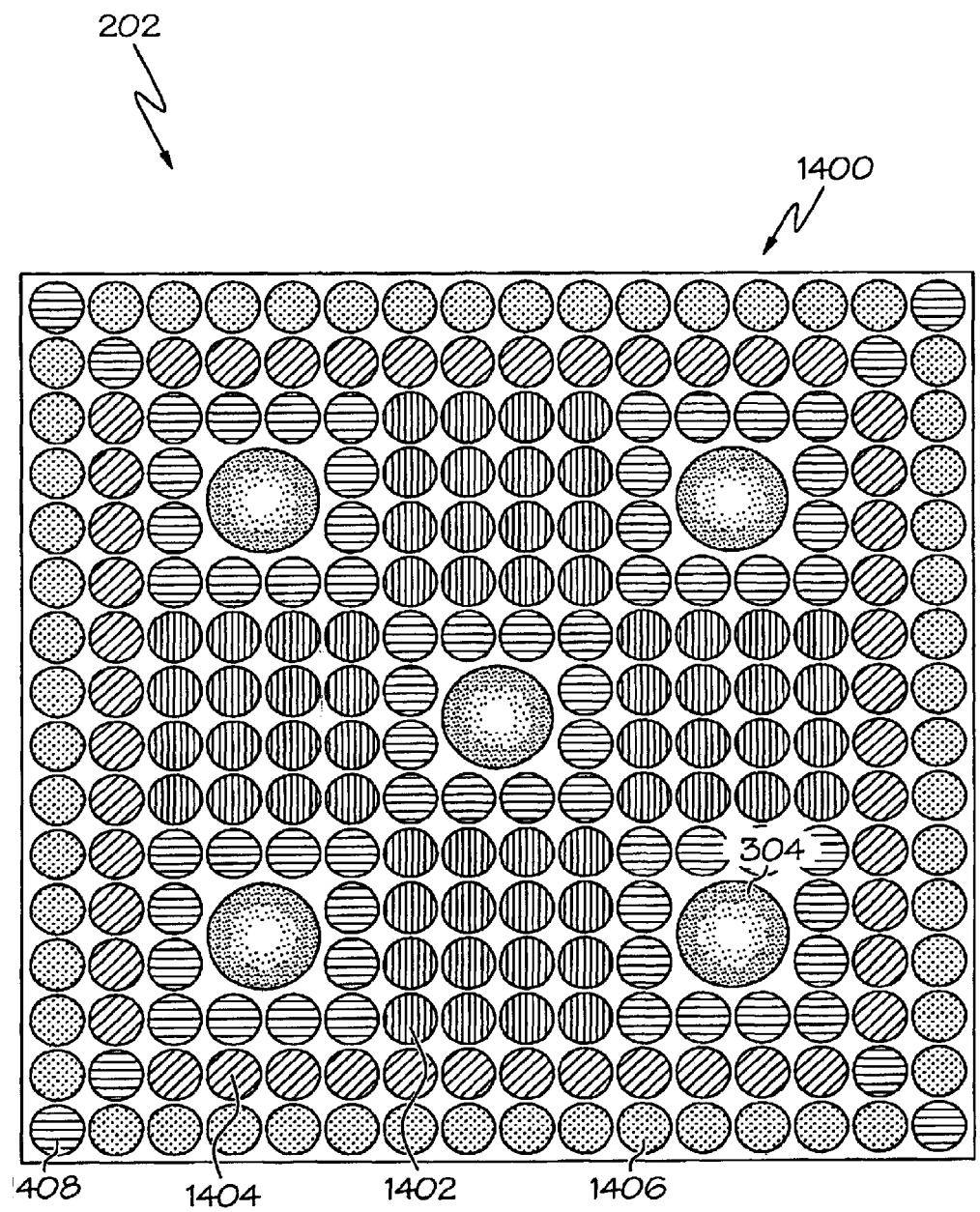
FIG. 14 shows a block diagram of an exemplary initial lattice structure for one of the fuel assemblies of FIG. 2.

FIG. 14 shows a block diagram of an exemplary initial lattice structure 1400 for one of fuel assemblies 202. In an exemplary embodiment, fuel pins 300 within initial lattice structure 1400 include high enrichment type fuel pins 1402, medium enrichment type fuel pins 1404, and low enrichment type fuel pins 1406. Initial lattice structure 1400 may also be termed an "initial intra-lattice enrichment split." That is, initial lattice structure 1400 identifies an initial division, or "split", of fuel pins 300 that are of high enrichment type 1402, medium enrichment type 1404, and low enrichment type 1406. Initial lattice structure further includes a poison type fuel pins 1408, the loading of which may be based on predictions, observations, and so forth. In this exemplary embodiment, poison type fuel pins 1408 generally surround guide tubes 304.

A typical current lattice structure (not shown) includes low enrichment type fuel pins 1406 surrounding guide tubes 304, while high enrichment type fuel pins 1402 make up the rest of fuel assembly 202. In one configuration, forty-eight of the sixty peripheral fuel pins 300 are high enrichment type fuel pins 1402. Through the examination of the current lattice structure in a ring type loading pattern, such as loading pattern 200, it has been discovered that this arrangement of high and low enrichment type fuel pins 1402 and 1406, respectively, "pushes" power to the high enrichment type fuel pins 1402.

This typical current lattice structure is further compromised in the ring type loading pattern, such as loading pattern 200, because higher levels of burnable absorber are necessary to control power generation of the feed (new) fuel assemblies. In the typical current lattice structure (not shown), low enrichment poison type fuel pins (not shown) are positioned in the lattice interior near guide tubes 304. This placement of burnable absorber pins has the effect of further shifting power to the peripheral fuel pins 300. Unfortunately, this shifting of power to the peripheral fuel pins 300 results in excessive crud deposition on the peripheral fuel pins.

As shown, and with this information in mind, initial lattice structure 1400 may be selected by generally arranging more high enrichment type fuel pins 1402 toward the interior and more low enrichment type fuel pins 1406 toward the periphery of fuel assembly 202. It should-be understood that designators "high", "low", and "medium" of enrichment type fuel pins are relative. In addition, the types of fuel pins 300 and the arrangement of fuel pins 300 provided in initial lattice structure 1400 are provided for illustrative purposes and should not be construed as an actual lattice structure for fuel assembly 202.

FIG. 13 Continued

Following task 1300, lattice structure generation process 416 continues with a task 1302. At task 1302, the lattice structure, in this case initial lattice structure 1400, is depleted to the end of a burnup cycle. In an exemplary embodiment, task 1302 causes the execution of computer code, known to those skilled in the art that simulates the depletion of the fuel pins 300 in initial lattice structure 1400.

Following task 1302, a query task 1304 determines whether pin powers match within assembly flow distribution. As discussed previously, a T/H characteristic conducive to tenacious crud deposition is low coolant velocity, v. As such, initial lattice structure 1400 was established by adjusting fuel pins 300 such that low enrichment type fuel pins 1406 are generally positioned at location within lattice structure 1400 corresponding to positions in one of fuel assemblies 202 that mish exhibit low coolant velocity, v. Thus, at task 1304, a determination is made as to whether peak pin powers match with the peak assembly flow rates, i.e., high peak pin powers at locations of high coolant velocity, and low peak pin powers at locations of low coolant velocity.

In addition, query task 1304 determines whether a pin power at a beginning period of the burnup cycle is substantially equivalent to the pin power at a middle period of the burnup cycle. The remaining tasks in the flowchart of FIG. 13 shall be discussed herein below, following a discussion of FIG. 15.

FIG. 15

Figure 15:
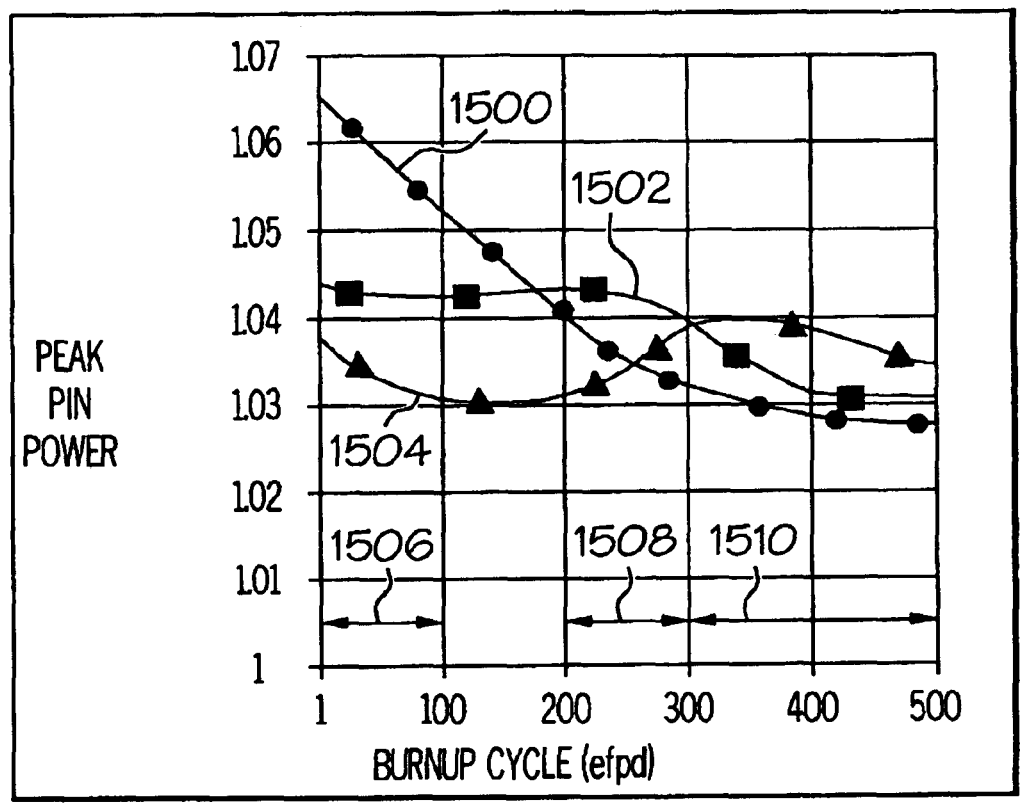
FIG. 15 shows a graph of peak pin power versus burnup cycle generated through the execution of the lattice structure generation process of FIG. 13.

FIG. 15 shows a graph of peak pin power versus burnup cycle generated through the execution of the lattice structure generation process 416. A first curve 1500 represents an exemplary pin power profile for a current lattice structure (not shown). A second curve 1502 represents an exemplary pin power profile for initial lattice structure 1400, and a third curve 1504 represents an exemplary pin power profile for a candidate lattice structure, discussed below. A beginning period 1506 occurs approximately between 0 to 100 efpd. Similarly, a middle period 1508 occurs approximately between 200 to 300 efpd, and an end period 1510 occurs following middle period 1508.

First curve 1500 illustrates a problem with a current lattice structure having high enrichment type fuel pins located about the periphery of fuel assembly 202 and low enrichment type fuel pins located at the interior of fuel assembly. As shown, the highest peak pin power occurs during beginning period 1506. High peak pin power exacerbates crud deposition on fuel pins 300. Moreover, as discussed in connection with crud deposition model 412, the propensity for crud deposition is significantly higher at the beginning of a burnup cycle, i.e., burnup time, than later during the burnup cycle. Accordingly, first curve 1500 highlights an undesirable scenario in which non-uniform and excessive crud deposition is likely to occur.

Second curve 1502 represents peak pin powers throughout the burnup cycle for initial lattice structure 1400. As shown, peak pin power of second curve 1502 at beginning period 1506 is significantly lower than the peak power at beginning period 1506 for first curve 1500. Accordingly, initial lattice structure 1400 represents an improvement in terms of fuel assembly performance over current lattice structures.

FIG. 13 Continued

With reference back to query task 1304, when query task 1304 determines that pin power do not match within the assembly flow distribution and/or pin powers during beginning period 1506 and middle period 1508 are not approximately equivalent, process 416 proceeds to a task 1306. A range within which pins powers could be determined as being approximately equivalent is, for example, within 0.01 as shown in FIG. 15.

At task 1306, a "next" lattice structure is generated. The next lattice structure may be generated by adjusting the combination of high enrichment type fuel pins 1402, medium enrichment type fuel pins 1404, and low enrichment type fuel pins 1406 of initial lattice structure 1400, while holding the loading of poison type fuel pins 1408 constant.

Following task 1306, process 416 loops back to task 1302 to deplete this "next" lattice structure to the end of the burnup cycle and subsequently compare pin powers within the assembly flow distribution and compare the peak pin powers at beginning period 1506 and middle period 1508. Thus, tasks 1302, 1304, and 1306 describe an iterative process with the goal of obtaining a lattice structure that exhibits a close match between peak pin powers and locations of peak coolant velocity, and between peak pin powers during beginning and middle periods 1506 and 1508.

When query task 1304 determines that peak pin powers during beginning and middle periods 1506 and 1508 are approximately equivalent, process 416 proceeds to a task 1308 having identified a promising intra-lattice enrichment split, i.e., a preliminary lattice structure. For the sake of simplicity query task 1304 determines that pin powers during beginning and middle periods 1506 and 1508, as represented by second curve 1502 are approximately equivalent. As such, initial lattice structure 1400 is a preliminary lattice structure.

At task 1308, fuel assemblies 202 whose fuel pins 300 are arranged in accordance with initial (i.e., preliminary) lattice structure 1400 are installed into a pre-existing loading pattern for reactor core 104. Again for simplicity, fuel assemblies 202 of initial lattice structure 1400 may be installed into exemplary second loading pattern 1100. For example, fuel assemblies 202 of initial lattice structure 1400 may replace feed fuel type 1 assemblies 204.

Task 1308 further causes processor 402 to operate to predict crud deposition on fuel assemblies 202 of initial lattice structure 1400, as described in connection with task 802 of fuel assembly loading pattern generation process 414.

A query task 1310 executed in response to task 1316 determines whether crud deposition characteristics on fuel assemblies 202 of second loading pattern 1100, inclusive of fuel assemblies 202 of initial lattice structure 1400, are within acceptable limits. The crud deposition characteristics may include peak crud deposition and the uniformity of crud deposition. The predicted peak crud deposition is compared against a peak crud deposition threshold. If the predicted peak crud deposition value is greater than the deposition threshold, query task 1310 determines that crud deposition characteristics are not within acceptable limits. In addition to, or alternatively, when crud deposition is determined to be non-uniform at query task 1310, process 416 proceeds to a task 1312. Task 1312 causes initial lattice structure 1400 to be rejected. In other words, the crud deposition characteristics are not satisfactory. Following task 1312, process 416 proceeds to a query task 1314 (discussed below).

However, when query task 1312 determines that crud deposition characteristics are within acceptable limits, process 416 proceeds to a task 1316. Task 1316 causes initial lattice structure 1400 to be identified as a candidate lattice structure. Information pertaining to initial lattice structure 1400 may subsequently be stored in lattice structure database 418. Following task 1316 and, as mentioned above, following the execution of task 1312, process 416 proceeds to query task 1314.

Query task 1314 determines whether the establishment and evaluation of lattice structures is to continue. When process 416 is to continue, process control loops back task 1300 to establish another lattice structure. Alternatively, when process 416 is to be discontinued, process 416 exits. Process 416 may be discontinued when a minimum number of lattice structures has been identified. The number of lattice structures to be identified may be based on contractual and/or practical considerations. For example, an assembler may limit their palette of lattice structures to a total of twenty. Process 416 is described in terms of the design of a single lattice structure. However, iteration of process 416 through query task 1314 desirably extends process 416 so that a full range of lattice structures can be developed. The range of lattice structures can include structures having different burnable poison loadings, i.e., quantity of poison type fuel pins 1408, different burnable poison placements, i.e., placement of poison type fuel pins 1408, and/or different intra-assembly enrichment splits.

FIG. 16

Figure 16:
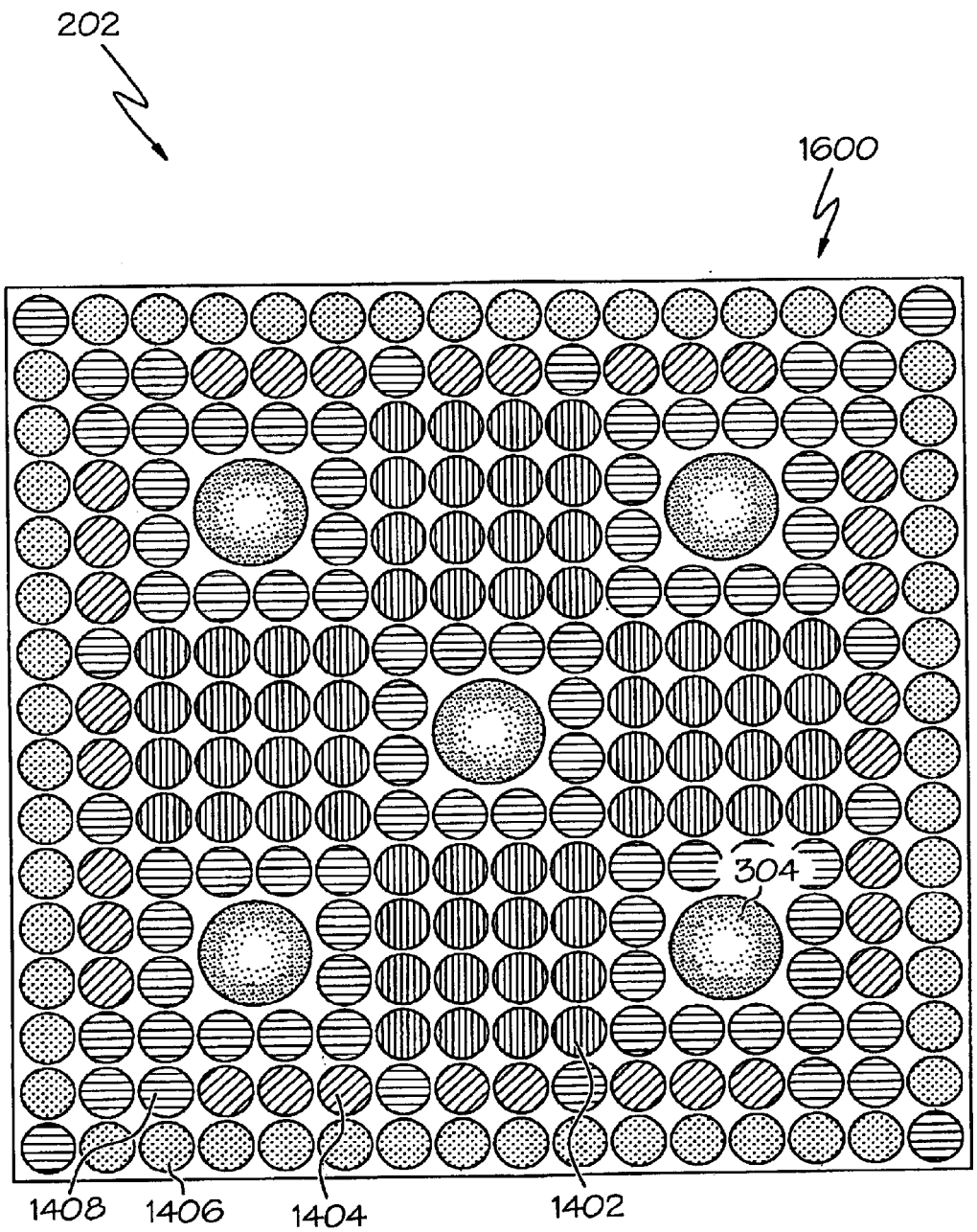
FIG. 16 shows a block diagram of a second lattice structure for one of the fuel assemblies of FIG. 2 in which poison type fuel pins have been interspersed.

FIG. 16 shows a block diagram of an exemplary second lattice structure 1600 for one of fuel assemblies 202. Second lattice structure 1600 has been established by adjusting initial lattice structure 1400 following a loop back from query task 1314 to task 1300. Some of high enrichment type fuel pins 1402 of initial lattice structure 1400 have been replaced by medium enrichment type fuel pins 1404. Thus, second lattice structure 1600 illustrates a change in the intra-lattice enrichment split, i.e., the quantities of each of high, medium, and low enrichment type fuel pins 1402, 1404, and 1406. In addition, the placement and loading of poison type fuel pins 1408 has been modified. That is, some of high and medium enrichment type fuel pins 1402 and 1404, respectively, of initial lattice structure 1400 have been replaced by poison type fuel pins 1408.

Referring momentarily to FIG. 15, third curve 1504 represents the pin powers throughout the burnup cycle for second lattice structure 1600 generated through the execution of lattice structure generation process 416. As shown, pin power of third curve 1504 at beginning period 1506 is significantly lower than the pin powers at beginning period 1506 for each of first curve 1500 and second curve 1502. More importantly, the peak pin power for third curve 1504 is found during end period 1510. In other words, peak pin power during the particular burnup cycle has shifted to the last half of the burnup cycle when the propensity of crud deposition is lower.

Second lattice structure 1600 represents an improvement in terms of fuel assembly performance over both current lattice structures, represented by first curve 1500, and initial lattice structure 1400, represented by second curve 1502. As such, second lattice structure 1600 also represents a promising intra-lattice enrichment split/burnable absorber loading configuration. Accordingly, through the iteration of lattice structure generation process 416, described in connection with FIG. 13, second lattice structure 1600 may also be identified as a candidate lattice structure at task 1316.

Crud deposition model 412 is described herein as being used to predict crud deposition on fuel assemblies 202 (coarse resolution). However, it should be readily apparent that crud deposition model is also readily employed to predict crud deposition uniformity on selected ones of fuel pins 300 as an adjunct to, or in place of, comparing pin power characteristics during a burnup cycle to identify potential lattice structures.

In summary, the present invention teaches of a reactor core and a method for arranging fuel assemblies in a reactor core. Fuel assembly loading patterns are generated and lattice structure designs are generated that are predicted to result in reduced total crud deposition and substantially uniform crud. Reduction in crud deposition reduces the onset of undesirable Axial Offset Anomaly. The present invention results in the generation of checkerboard loading patterns for fuel assemblies that nevertheless maintain the benefit of cost efficient ring type loading patterns without challenging power plant operations and fuel pin integrity. Moreover, by adjusting intra-lattice enrichment splits and burnable absorber placement during lattice structure redesign and disallowing changes to fuel pin diameter and pitch, the present invention is cost effectively implemented.

Although the preferred embodiments of the invention have been illustrated and described in detail, it will be readily apparent to those skilled in the art that various modifications may be made therein without departing from the spirit of the invention or from the scope of the appended claims. For example, there is a great variation in the order in which many of the tasks described herein may be performed.

What is claimed is:

1. A method of arranging fuel assemblies in a nuclear reactor core comprising:

establishing a first loading pattern for said fuel assemblies;

predicting crud deposition on said fuel assemblies in said first loading pattern; and altering said first loading pattern in response to said predicted crud deposition to generate a second loading pattern for said fuel assemblies.

2. A method as claimed in claim 1 further comprising performing said altering operation when said crud deposition on said fuel assemblies in said first loading pattern is non-uniform.

3. A method as claimed in claim 1 wherein said predicted crud deposition is a peak crud deposition characteristic, and said method further comprises performing said altering operation when said peak crud deposition characteristic exceeds a predetermined peak crud deposition threshold.

4. A method as claimed in claim 1 further comprising populating said reactor core with said fuel assemblies in response to said second loading pattern.

5. A method as claimed in claim 4 further comprising:

repeating said predicting operation prior to said populating operation to predict said crud deposition on said fuel assemblies in said second loading pattern;

determining that said predicted crud deposition on said fuel assemblies in said second loading pattern is substantially uniform across each of said fuel assemblies; and performing said populating operation in response to said determining operation.

6. A method as claimed in claim 1 further comprising:
repeating said predicting operation to predict said crud deposition on said fuel assemblies in said second loading pattern; and
altering said second loading pattern in response to said repeating operation to generate a third loading pattern for said fuel assemblies.

7. A method as claimed in claim 1 wherein:
said method further comprises identifying one of said fuel assemblies of said first loading pattern in which said predicted crud deposition is greater than said predicted crud deposition on others of said fuel assemblies, said one fuel assembly exhibiting a first power level; and
said altering operation comprises replacing said one fuel assembly with a second one of said fuel assemblies, said second one of said fuel assemblies exhibiting a second power level, said second power level being less than said first power level.

8. A method as claimed in claim 7 wherein said second loading pattern is a multi-cycle loading pattern in which said fuel assemblies include new fuel assemblies and previously burned fuel assemblies, said previously burned fuel assemblies exhibiting power levels that are less than said power levels of said new fuel assemblies, and said second one of said fuel assemblies is one of said previously burned fuel assemblies.

9. A method as claimed in claim 7 wherein said one fuel assembly includes fuel pins configured in a first lattice structure, and said second fuel assembly includes said fuel pins configured in a second lattice structure.

10. A method as claimed in claim 1 wherein each of said fuel assemblies includes fuel pins arranged in a pre-determined lattice structure, and said method further comprises generating said pre-determined lattice structure prior to said establishing operation, said pre-determined lattice structure having a propensity for substantially uniform crud deposition across said fuel pins of said each fuel assembly.

11. A method as claimed in claim 10 wherein said generating operation comprises:
selecting an initial lattice structure of said fuel pins, said fuel pins being selected from a group that includes at least a high enrichment pin type, a low enrichment pin type, and a poisoned pin type;
adjusting a combination of said fuel pins of said high enrichment pin type, said low enrichment pin type, and said poisoned pin type of said initial lattice structure to form an adjusted lattice structure; and
determining that a predicted pin power for a portion of said fuel pins within said adjusted lattice structure is approximately equivalent throughout a beginning period and a middle period of a burnup cycle.

12. A method as claimed in claim 11 wherein said adjusting operation comprises:
positioning said high enrichment pin type ones of said fuel pins in an interior of said each lattice structure; and
positioning said low enrichment pin type ones of said fuel pins about a periphery of said lattice structure.

13. A method as claimed in claim 11 wherein said adjusting operation comprises positioning said fuel pins of said low enrichment pin type at locations in said initial lattice structure that exhibit a coolant velocity that is lower than said coolant velocity at other locations in said lattice structure.

14. A method as claimed in claim 11 wherein said adjusting operation comprises positioning said fuel pins of said low enrichment pin type at locations in said initial lattice structure that exhibit a temperature difference between a clad temperature of said fuel pins and a sub-channel coolant temperature that is lower than said temperature difference at other locations in said initial lattice structure.

15. A method as claimed in claim 11 wherein said adjusting operation comprises positioning said fuel pins of said low enrichment pin type at locations in said initial lattice structure that exhibit a fuel pin heat flux that is greater than said fuel pin heat flux at other locations in said initial lattice structure.

16. A nuclear reactor core comprising:
first fuel assemblies characterized by a first power level; and
second fuel assemblies characterized by a second power level, said first and second fuel assemblies being arranged in response to said first and second power levels to form a loading pattern predicted to cause substantially uniform crud deposition on said first and second fuel assemblies.

17. A reactor core as claimed in claim 16 wherein said second power level of said second fuel assemblies is less than said first power level of said second fuel assemblies, and said second fuel assemblies are positioned at locations in said reactor core exhibiting a coolant velocity that is lower than said coolant velocity at others of said locations in said reactor core.

18. A reactor core as claimed in claim 16 wherein each of said first and second fuel assemblies includes fuel pins arranged in a lattice structure exhibiting a propensity for substantially uniform crud deposition across said fuel pins.

19. A reactor core as claimed in claim 18 wherein said lattice structure further exhibits a peak crud deposition characteristic that is less than a pre-determined peak crud deposition threshold.

20. A reactor core as claimed in claim 18 wherein said fuel pins of each of said first and second fuel assemblies comprise:
high enrichment fuel pins positioned in an interior of said each of said first and second fuel assemblies; and
low enrichment fuel pins positioned about a periphery of said each of said first and second fuel assemblies to form said lattice structure, wherein locations of said high enrichment and low enrichment fuel pins in said lattice structure cause a pin power of said fuel pins during a beginning period of a burnup cycle and said pin power of said fuel pins during a middle period of said burnup cycle to be approximately equivalent.

21. A reactor core as claimed in claim 20 wherein said fuel pins of said each of said first and second fuel assemblies further comprise poisoned fuel pins interspersed between said high and low fuel pin types of said fuel pins.

22. A method of arranging fuel assemblies in a nuclear reactor core comprising:
establishing a first loading pattern for said fuel assemblies;
predicting crud deposition on said fuel assemblies in said first loading pattern;
altering said first loading pattern when said crud deposition on said fuel assemblies in said first loading pattern is non-uniform to generate a second loading pattern for said fuel assemblies;
predicting said crud deposition on said fuel assemblies in said second loading pattern;
when said crud deposition on said fuel assemblies in said first loading pattern is substantially uniform, populating said reactor core with said fuel assemblies in response to said second loading pattern.

23. A method as claimed in claim 22 wherein:

said method further comprises identifying one of said fuel assemblies of said first loading pattern in which said predicted crud deposition is greater than said predicted crud deposition on others of said fuel assemblies, said one fuel assembly exhibiting a first power level; and said altering operation comprises replacing said one fuel assembly with a second one of said fuel assemblies, said second one of said fuel assemblies exhibiting a second power level, said second power level being less than said first power level.

* * * * *